United States Patent
Shiga

(10) Patent No.: US 7,802,751 B2
(45) Date of Patent: Sep. 28, 2010

(54) TAPE REEL, RECORDING TAPE CARTRIDGE, TAKE-UP REEL, AND DRIVE DEVICE

(75) Inventor: Hideaki Shiga, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 151 days.

(21) Appl. No.: 11/956,208

(22) Filed: Dec. 13, 2007

(65) Prior Publication Data

US 2008/0173749 A1 Jul. 24, 2008

(30) Foreign Application Priority Data

Jan. 19, 2007 (JP) .............................. 2007-010833

(51) Int. Cl.
*B65H 75/08* (2006.01)
*G11B 23/107* (2006.01)

(52) U.S. Cl. .............. 242/613.4; 242/348.2; 242/608.6; 242/118.31

(58) Field of Classification Search .............. 242/348.2, 242/407, 608.6, 613, 613.4, 118.31, 118
See application file for complete search history.

(56) References Cited

U.S. PATENT DOCUMENTS

| | | | |
|---|---|---|---|
| 6,257,519 B1 * | 7/2001 | Willems et al. | 242/608.6 |
| 6,983,908 B2 * | 1/2006 | Hiraguchi | 242/348 |
| 7,032,855 B2 * | 4/2006 | Shiga | 242/614 |
| 7,410,118 B2 * | 8/2008 | Shiga | 242/614 |
| 7,523,887 B2 * | 4/2009 | Ishikawa | 242/613.4 |
| 7,533,840 B2 * | 5/2009 | Sumiya et al. | 242/348 |
| 7,562,842 B2 * | 7/2009 | Ishikawa | 242/610.4 |
| 2004/0061015 A1 * | 4/2004 | Hiraguchi | 242/348 |
| 2006/0186245 A1 * | 8/2006 | Shiga | 242/348.2 |

(Continued)

FOREIGN PATENT DOCUMENTS

JP 61-054086 3/1986

(Continued)

OTHER PUBLICATIONS

EP Communication, dated Apr. 28, 2009, issued in corresponding EP Application No. 07024154.2, 9 pages.

(Continued)

*Primary Examiner*—Evan H Langdon
(74) *Attorney, Agent, or Firm*—Sughrue Mion, PLLC

(57) ABSTRACT

There are provided a tape reel and a take-up reel at which it is possible to easily and inexpensively manufacture a hub having, at an outer peripheral surface thereof, a portion whose diameter is larger than diameters of each of the end portions of the hub, and a recording tape cartridge having the tape reel and a drive device having the take-up reel. At a tape reel 20 having a hub 22, which is made of resin on which a recording tape T is wound, and flanges 24, 26, which are provided at both end portions of the hub 22, a ring-shaped member 48, whose outer diameter is larger than an inner diameter of at least one portion of the hub 22, is press-fit in at an inner side of the hub 22. The tape reel 20 which has the hub 22 having, at least a portion of an outer peripheral surface, a portion whose diameter is larger than diameters of each of the end portions of the hub, is thereby easily formed.

23 Claims, 17 Drawing Sheets

U.S. PATENT DOCUMENTS

2008/0173749 A1 * 7/2008 Shiga .................. 242/407

FOREIGN PATENT DOCUMENTS

| JP | 63-222844 | | 9/1988 |
|----|-----------|---|--------|
| JP | 6-309837 | A | 11/1994 |
| JP | 08-315540 | | 11/1996 |
| JP | 2001-118358 | A | 4/2001 |
| JP | 2002-303319 | A | 10/2002 |
| JP | 2003-168278 | A | 6/2003 |

OTHER PUBLICATIONS

Notice of Reasons for Rejection, dated Jul. 27, 2010, issued in corresponding JP Application No. 2007-010833, 4 pages in English and Japanese.

* cited by examiner

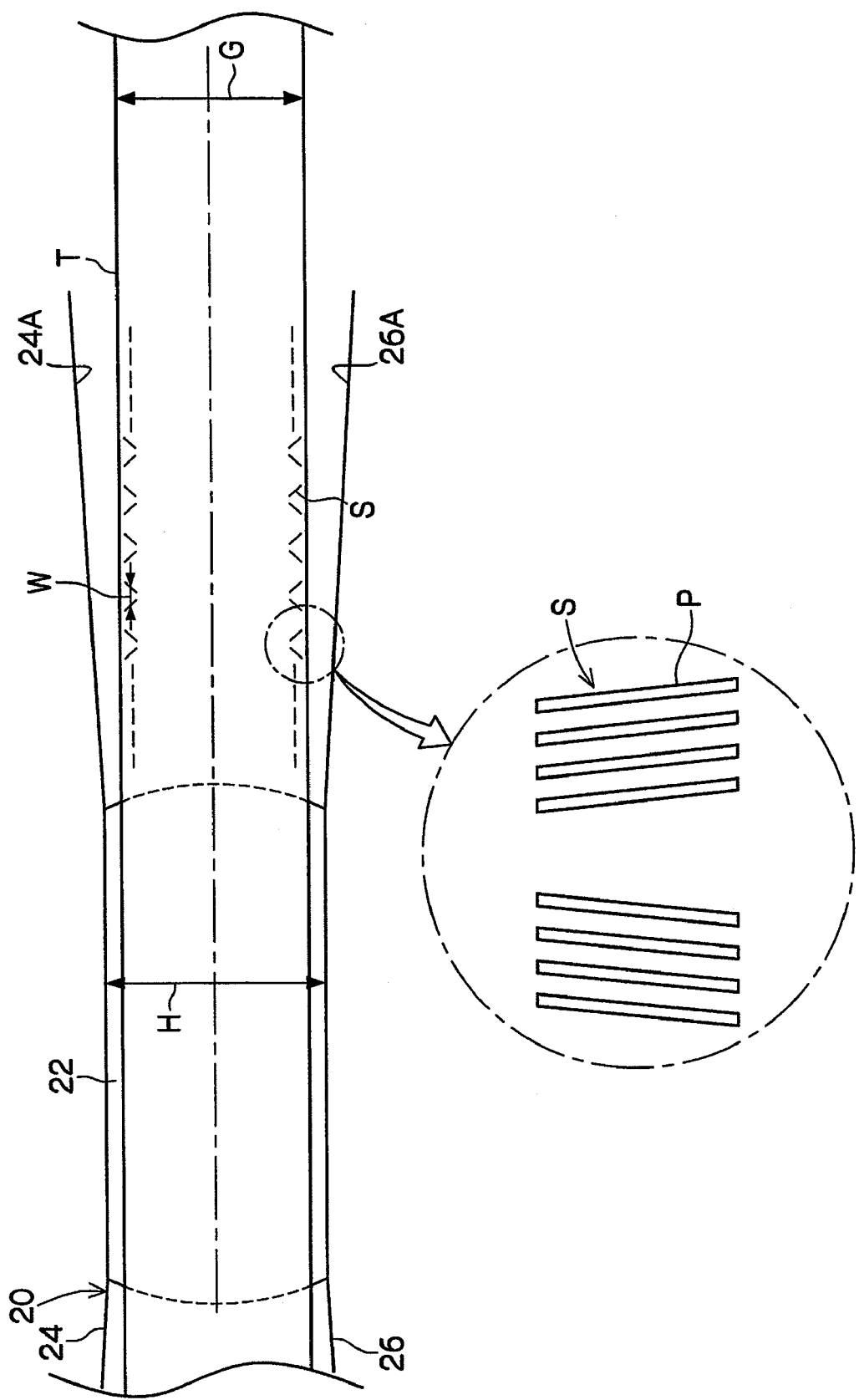

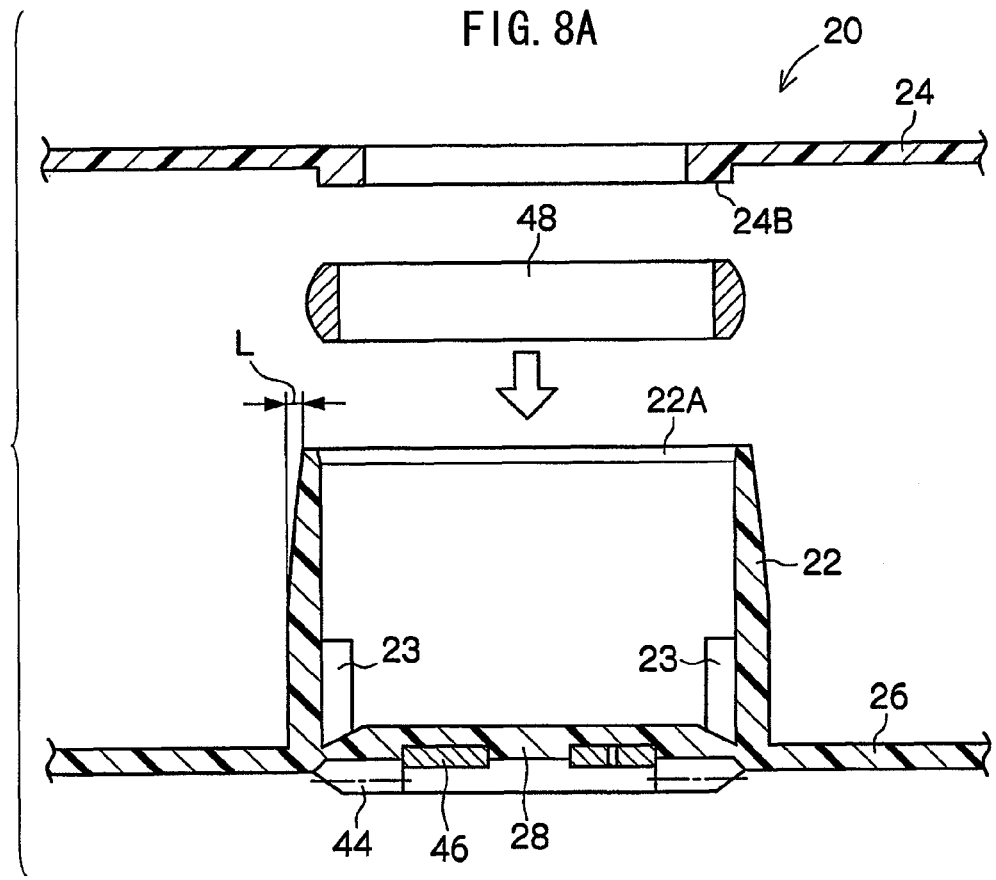
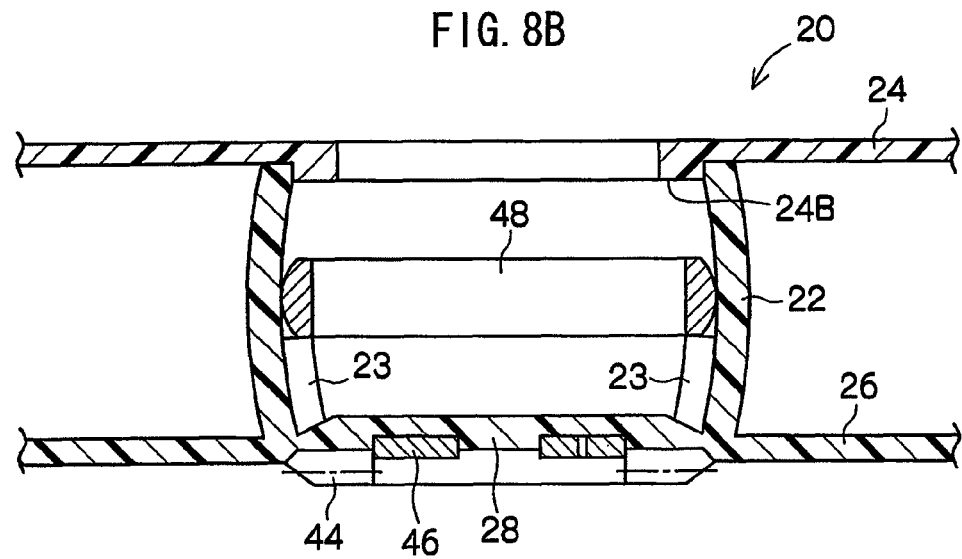

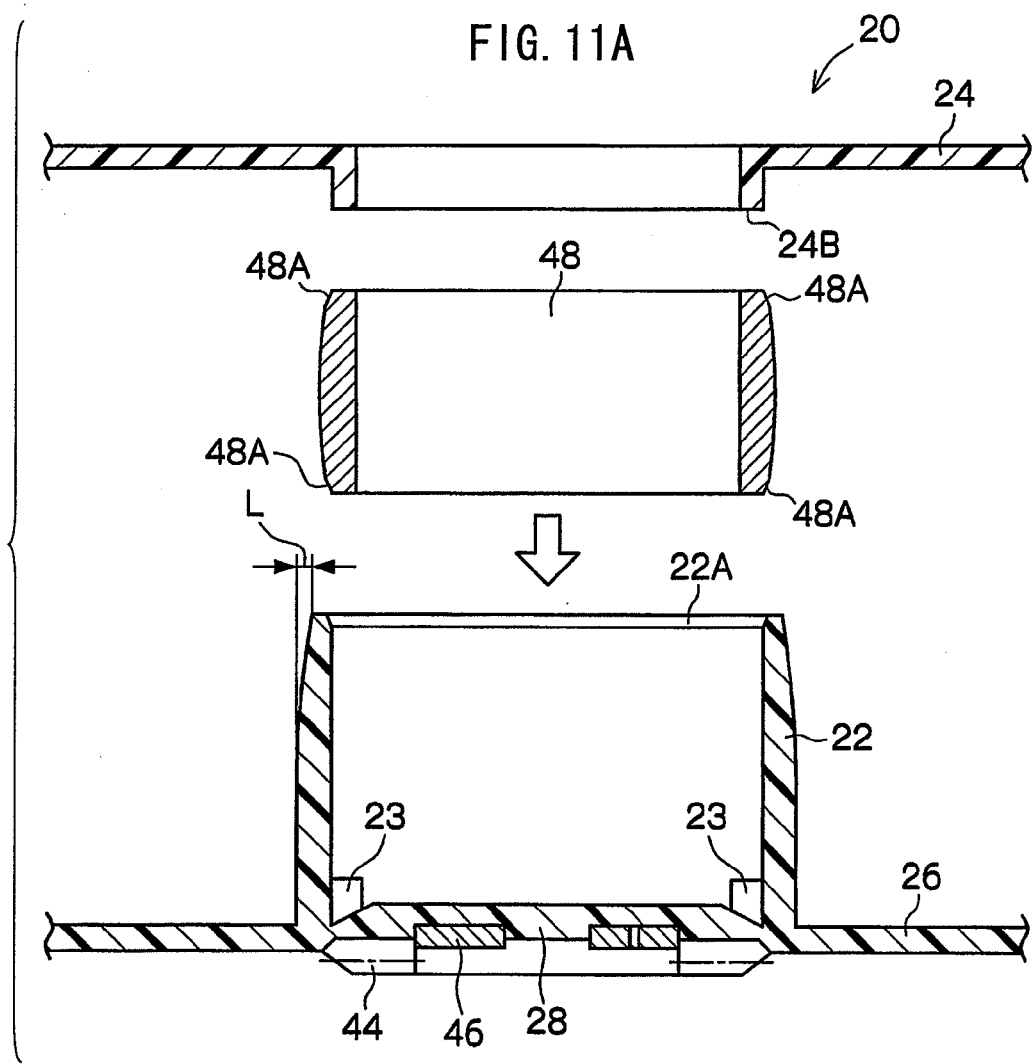
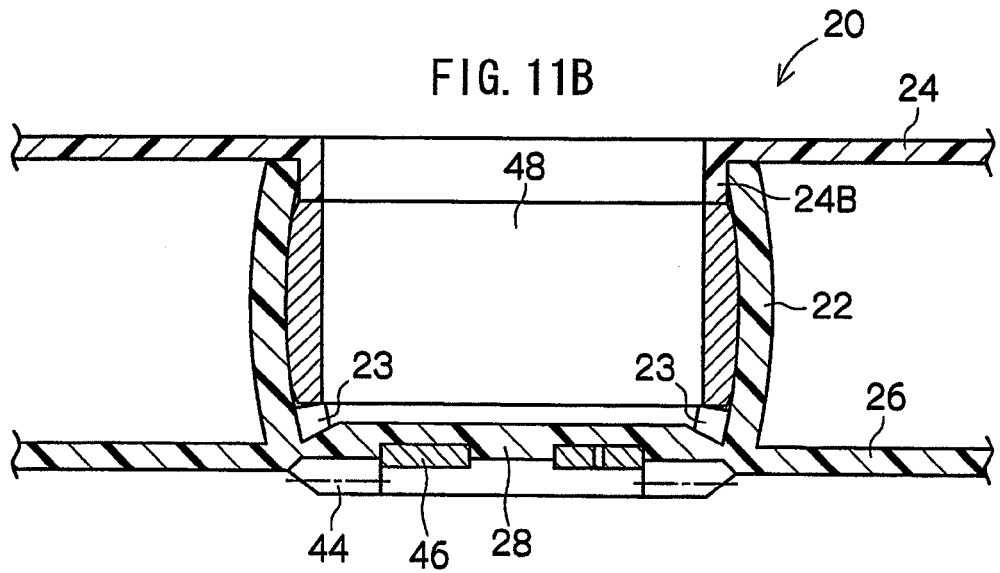

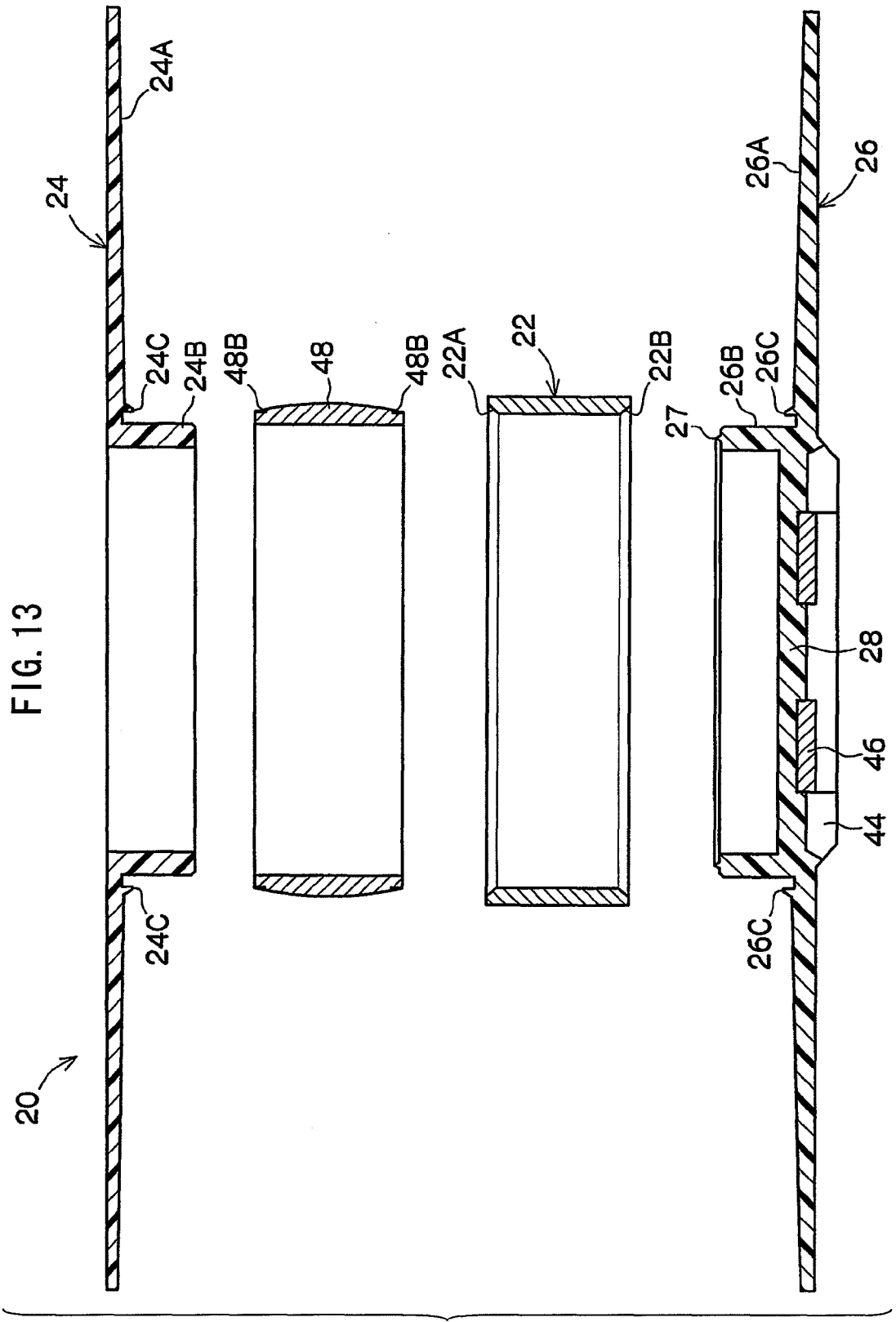

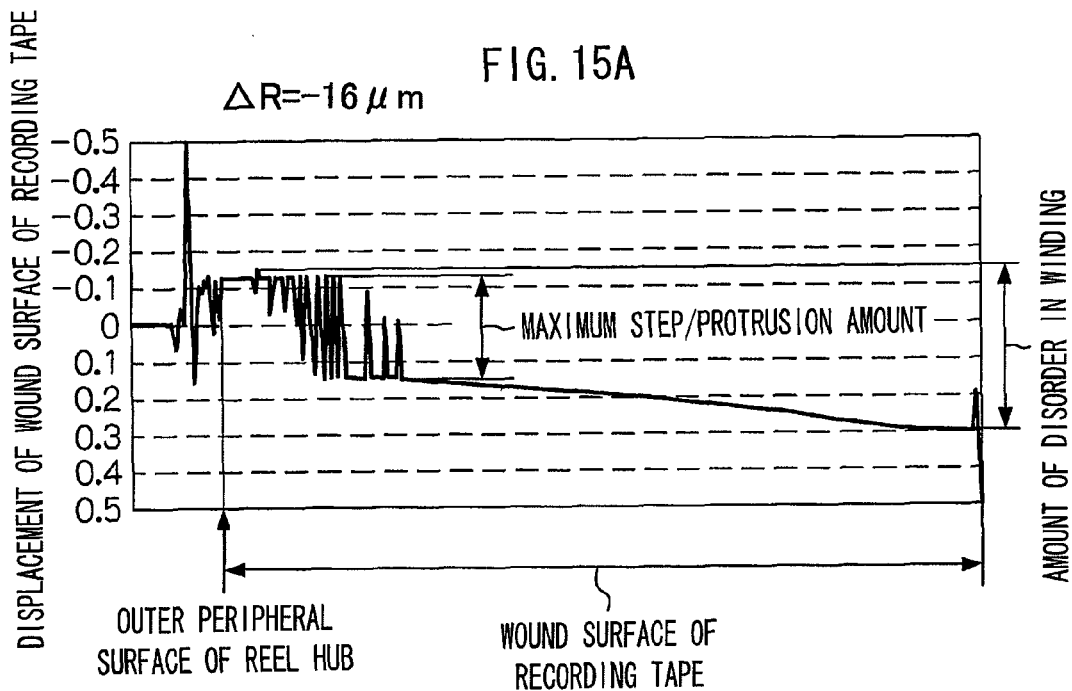
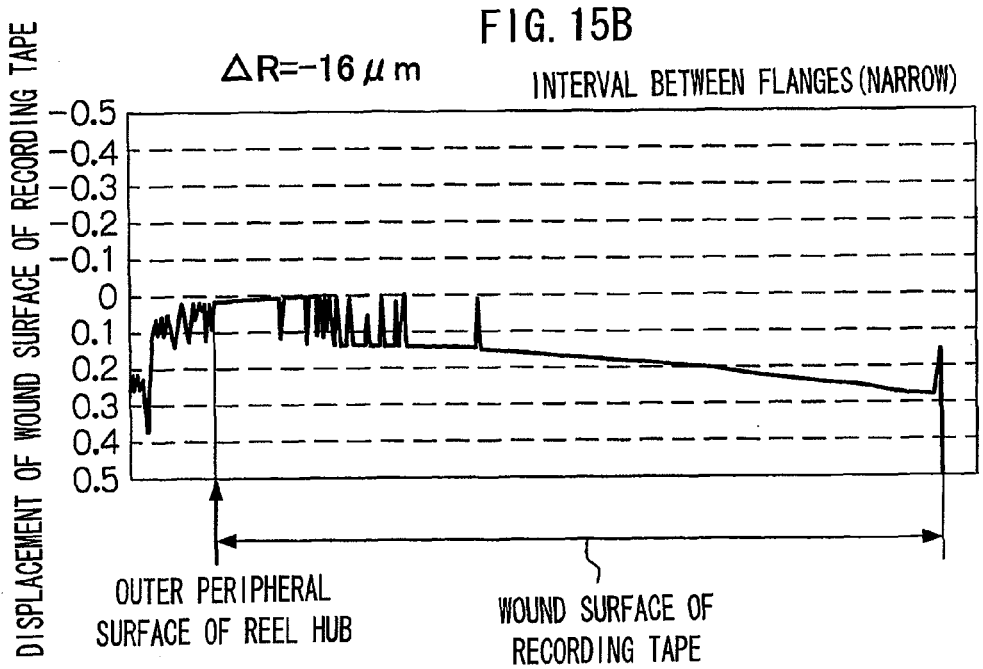

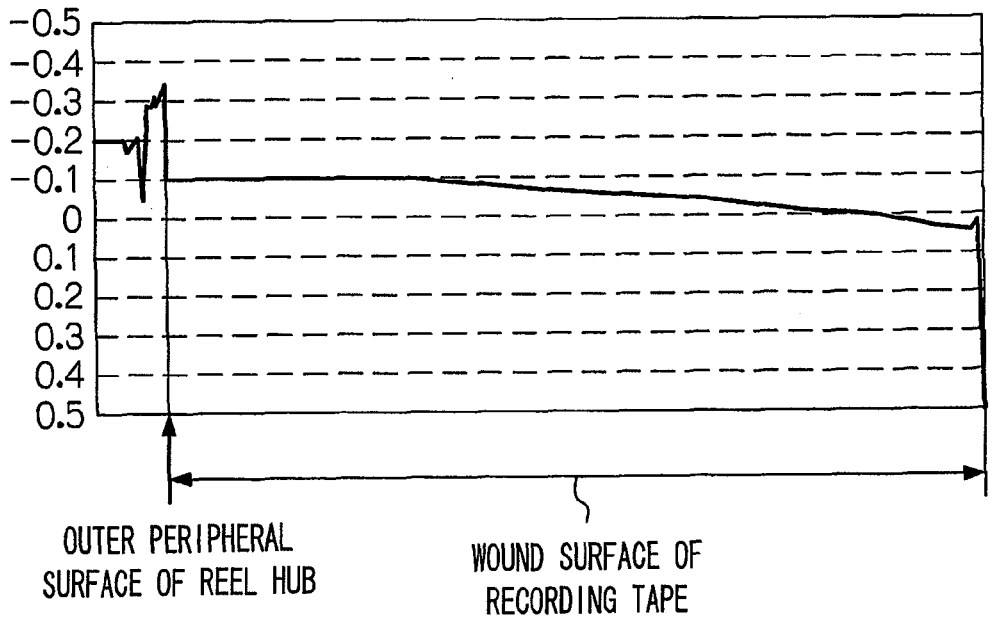
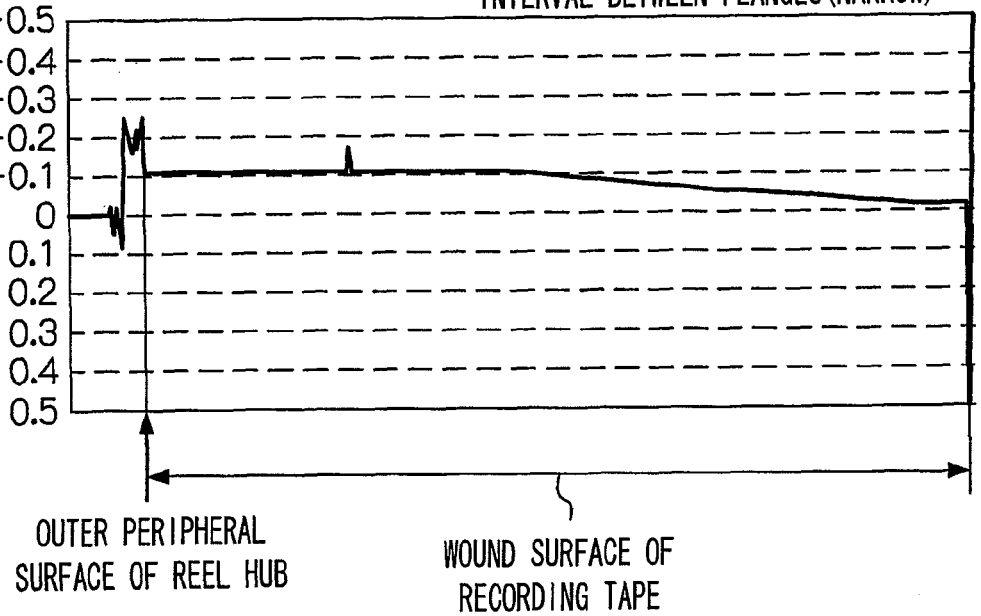

TAPE REEL, RECORDING TAPE CARTRIDGE, TAKE-UP REEL, AND DRIVE DEVICE

CROSS-REFERENCE TO RELATED APPLICATION

This application claims priority under 35 USC 119 from Japanese Patent Application No. 2007-010833, the disclosure of which is incorporated by reference herein.

BACKGROUND OF THE INVENTION

1. Field of the Invention

The present invention relates to a tape reel and a take-up reel on which is wound a recording tape, such as a magnetic tape or the like, which is used as a recording/playback medium mainly of computers or the like, and to a recording tape cartridge which accommodates the tape reel within a case, and to a drive device which is provided with the take-up reel and into which the recording tape cartridge is loaded.

2. Description of the Related Art

There are conventionally known recording tape cartridges in which a recording tape, such as a magnetic tape or the like which is used as a data recording/playback medium (for data backup) of computers or the like, is wound on the hub (core portion) of a reel (tape reel), and the reel is singly accommodated within a case. When the recording tape cartridge is loaded into a drive device, the recording tape is pulled out via a leader member from an opening provided in the recording tape cartridge. The pulled out recording tape is, via tape guides and a recording/playback head, taken-up onto a take-up reel within the drive device.

There has been conventionally disclosed, at a reel or the like on which such a recording tape is wound, causing the width direction central portion of the hub for example to swell-out (be formed in a convex shape) so as to form a substantial barrel shape, as shown in Japanese Patent Application Laid-Open (JP-A) No. 6-309837 for example. Further, as shown in JP-A No. 2001-118358 for example, a reel at which a portion (a maximum diameter portion), whose outer diameter is larger than the outer diameter at the both end portions, is formed at the outer peripheral surface of the hub in this way, is manufactured by forming the hub and flanges by injection molding a plastic material such as polycarbonate (PC), polyacetal (POM) or the like, and thereafter, assembling them by adhesion, welding, snap-fitting (the engagement of claws) using elasticity, or the like.

However, when an attempt is made to form the shape of a hub which is molded by injection molding into a substantial barrel shape for example, there is the problem of so-called undercut (a shape which cannot be ejected out from the mold at the time of release from the mold after molding). Further, due to so-called sink mark, non-uniformity of the molding pressure distribution, non-uniformity in cooling, effects due to the shape or wall-thickness, or the like, the shape of the outer peripheral surface of an injection-molded hub becomes taper-shaped, hourglass-shaped, or a complex shape combining these, and a shape such as a barrel or a pot or the like cannot be accurately realized by injection molding.

As methods for overcoming this, a method of providing the parting line at the maximum diameter portion of the hub, and a method of providing parting portions at plural places in the widthwidth direction (the heightwise direction of the hub) and providing the mold with a sliding mechanism have been thought of. However, in such methods, a parting line arises at the outer peripheral surface of the hub around which the recording tape is wound, and a step or burrs arise at this portion, and there is the concern that cutting, damage or deformation or the recording tape, or damage or destruction of servo signals and data (information) due to damage or deformation will arise. Namely, there is the concern that such problems will cause the occurrence of servo tracking errors or errors in the recording and playback of information.

Further, due to the increasing of capacities in recent years, there has been the trend to make a recording tape T thinner, and the strength thereof also decreases. Therefore, it has become even easier than before for recording tapes to be damaged, deformed, or cut. Moreover, as shown in JP-A No. 2001-118358 for example, a method has also been conceived in which the hub and the upper and lower flanges are manufactured by respectively being molded independently, and only the hub is formed in a substantial barrel shape or the like by cutting. However, not only is it necessary to form the hub in a substantial barrel shape or the like, but there is also the need to form positioning configurations for engagement with the upper and lower flanges and a drive device at the both end portions of the hub, and therefore, there is the problem that the manufacturing cost increases several-fold. Further, take-up reels are provided at drive devices as well, and the same holds for take-up reels as well.

SUMMARY OF THE INVENTION

The present invention has been made in view of the above circumstances and provides a tape reel, a recording tape cartridge, a take-up reel, and a drive device.

A first aspect of the present invention provides a tape reel comprising: a hub made of resin on which a recording tape is wound; and flanges provided at both end portions of the hub, wherein a ring-shaped member, whose outer diameter is larger than an inner diameter of at least one portion of the hub, is press-fit in at an inner side of the hub, and a second portion, whose diameter is larger than diameters of each of the end portions of the hub, is formed at least a portion of an outer peripheral surface of the hub.

A second aspect of the present invention provides a recording tape cartridge comprising: the tape reel of the first aspect; and a case accommodating the tape reel rotatably.

A third aspect of the present invention provides a take-up reel provided within a drive device on which is wound a recording tape pulled out from a recording tape cartridge, the take-up reel comprising: a hub made of resin on which the recording tape is wound; and flanges provided at both end portions of the hub, wherein a substantially-ring-shaped member, whose outer diameter is larger than an inner diameter of at least one portion of the hub, is press-fit in at an inner side of the hub, and a second portion, whose diameter is larger than diameters of each of the end portions of the hub, is formed at least a portion of an outer peripheral surface of the hub.

A fourth aspect of the present invention provides a drive device in which a recording tape cartridge is loaded, comprising: the take-up reel of the third aspect on which the recording tape, which is pulled out from the recording tape cartridge, is wound.

BRIEF DESCRIPTION OF THE DRAWINGS

Embodiments of the present invention will be described in detail based on the following figures, wherein:

FIG. 6 is a schematic side view showing servo signals of a recording tape;

FIG. 8A is a schematic side view explaining a method of manufacturing the reel;

FIG. 8B is a schematic side view explaining a method of manufacturing the reel;

FIG. 11A is a schematic side view explaining a method of manufacturing another reel;

FIG. 11B is a schematic side view explaining a method of manufacturing another reel;

FIG. 13 is a schematic side view explaining a method of manufacturing another reel;

FIG. 15A is a recording tape wound posture measurement chart in a case in which $\Delta R=-16$ μm and the flange interval is a conventional interval;

FIG. 15B is a recording tape wound posture measurement chart in a case in which $\Delta R=-16$ μm and the flange interval is narrower than a conventional interval;

FIG. 16A is a recording tape wound posture measurement chart in a case in which $\Delta R=58$ μm and the flange interval is a conventional interval;

FIG. 16B is a recording tape wound posture measurement chart in a case in which $\Delta R=58$ μm and the flange interval is narrower than a conventional interval;

DETAILED DESCRIPTION OF THE INVENTION

Figure 1:
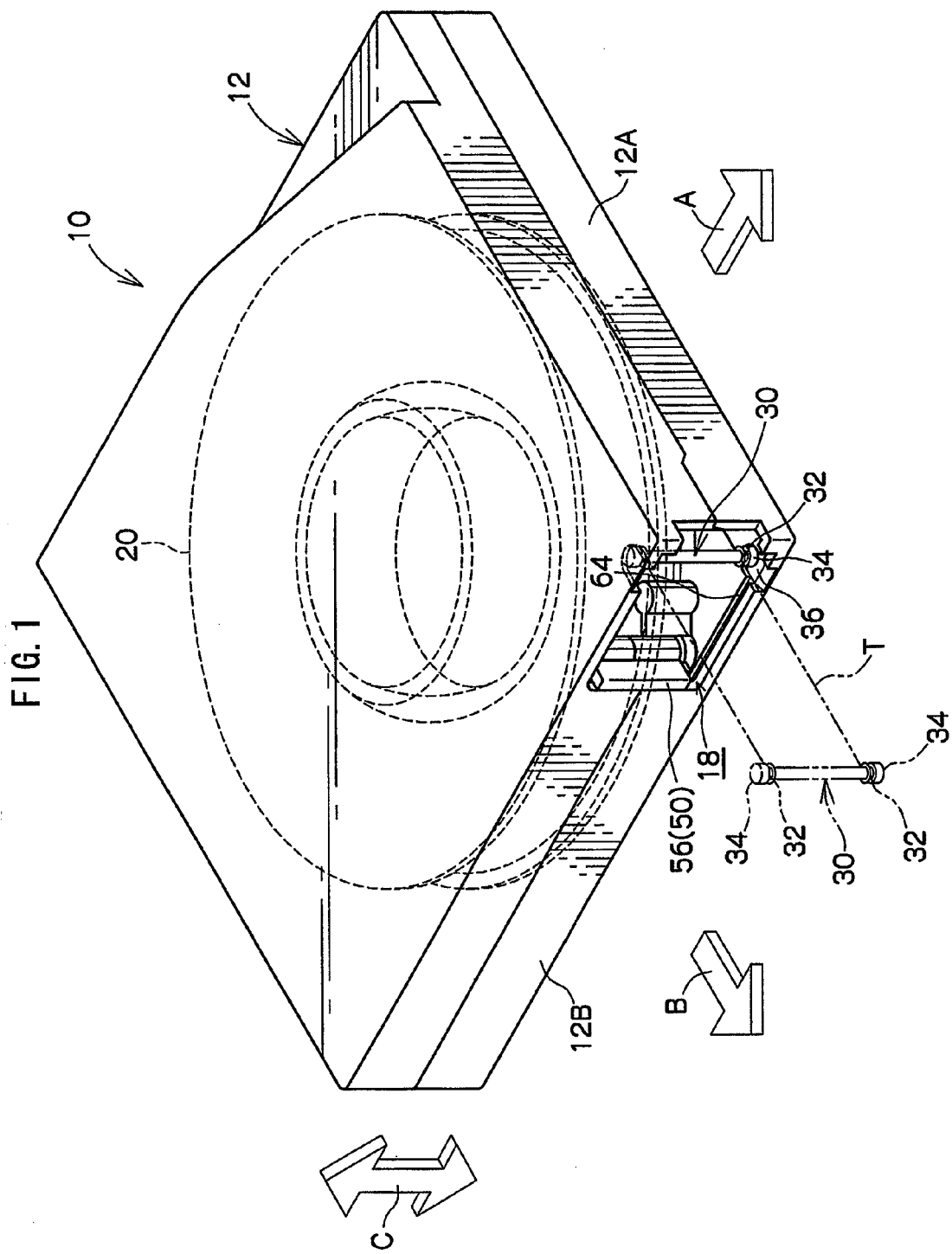
FIG. 1 is a schematic perspective view of a recording tape cartridge relating to a present embodiment.

Herebelow, an example of an exemplary embodiment of the present invention will be described in detail with reference to the drawings. Note that, for convenience of explanation, in FIG. 1, the direction of loading a recording tape cartridge 10 into a drive device 70 (see FIG. 4) is denoted by arrow A, and this direction of arrow A is the forward direction (front side) of the recording tape cartridge 10. The direction of arrow B, which is orthogonal to arrow A, is the rightward direction (right side). Further, the direction of arrow C is the width direction in the present exemplary embodiment, and is the same direction as the vertical direction and the heightwise direction, as well as the axial direction of a reel 20 (a reel hub 22) and a take-up reel 80 (a reel hub 82).

Figure 2:
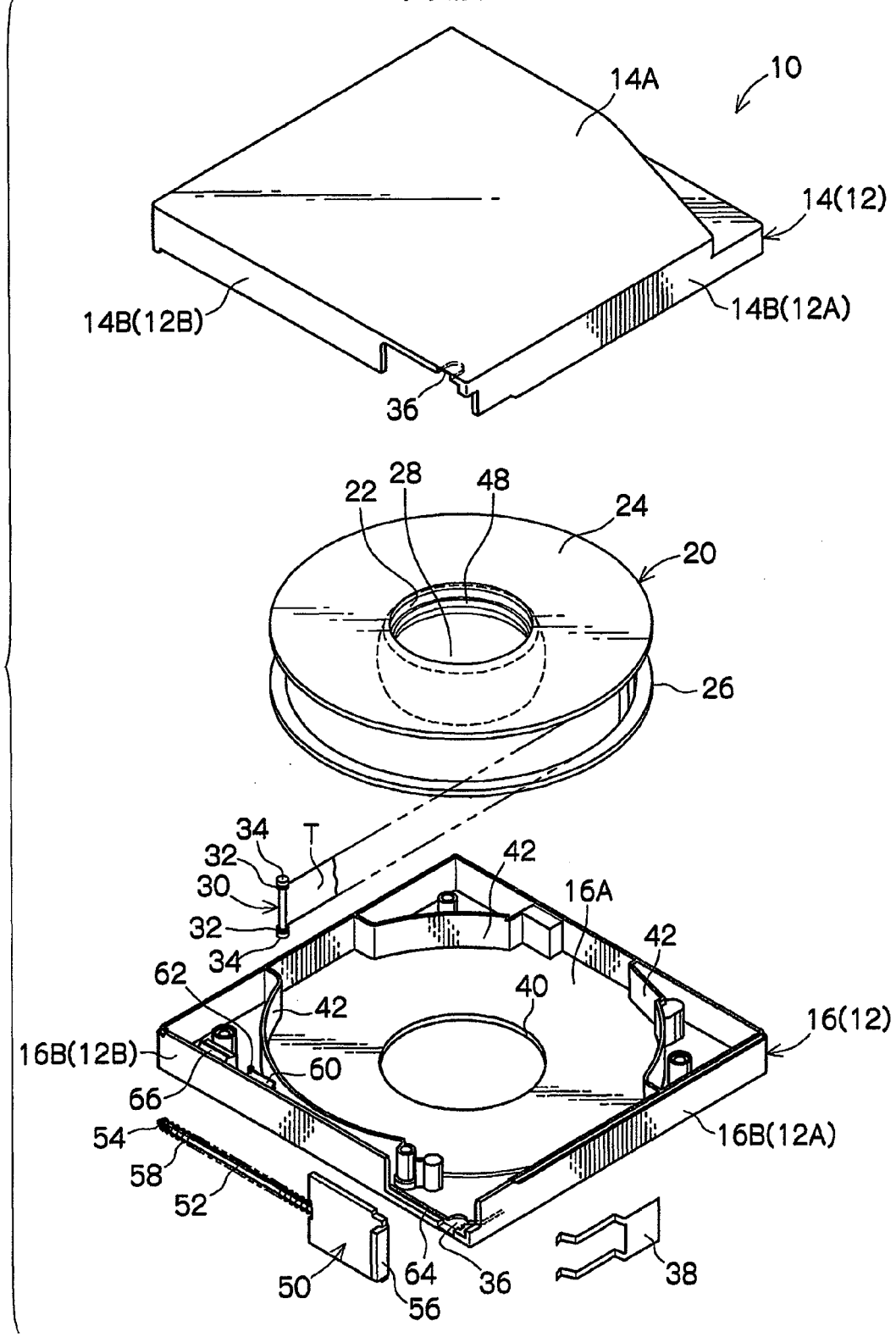
FIG. 2 is a schematic exploded perspective view of the recording tape cartridge relating to the present embodiment.

As shown in FIG. 1 and FIG. 2, the recording tape cartridge 10 has a case 12 which is substantially shaped as a rectangular box. The case 12 is structured by an upper case 14 and a lower case 16, which are made of a resin such as polycarbonate (PC) or the like, being joined together by ultrasonic welding, screws or the like in a state in which a peripheral wall 14B, which stands erect at the peripheral edge of a ceiling plate 14A, and a peripheral wall 16B, which stands erect at the peripheral edge of a floor plate 16A, are abutting one another.

Only one of the reel (tape reel) 20 is rotatably accommodated within the case 12. The reel 20 has the reel hub 22 which is formed in a substantially cylindrical shape having a floor and which structures the axially central portion (core portion) of the reel 20, an upper flange 24 provided at the upper end portion of the reel hub 22, and a lower flange 26 provided at the lower end portion of the reel hub 22. The lower flange 26 and the reel hub 22 are molded integrally. Further, the upper flange 24 which is annular is ultrasonically welded to and structured integrally with the upper end portion of the reel hub 22.

The height of a boss portion 24B, which extends downward at the inner peripheral edge portion of the upper flange 24 and engages, from the radial direction inner side, with the upper end portion of the inner peripheral surface of the reel hub 22, is formed to an extent such that it is slightly higher than the plate thickness of the upper flange 24. The configurational accuracy of the upper flange 24 can thereby be ensured. Further, the mutually-opposing surfaces of the upper flange 24 and the lower flange 26 are taper surfaces 24A, 26A (see FIG. 3) at which the interval between the flanges gradually increases toward the outer side (the outer peripheral edge side).

A recording tape T, which is a magnetic tape or the like and serves as an information recording/playback medium, is wound on the outer peripheral surface of the reel hub 22 at a predetermined tight-winding force F (e.g., F=0.588 N to 0.980 N). The width of the fluctuation in the width direction of the wound recording tape T is restricted by the upper flange 24 and the lower flange 26. Note that, in order to increase the recording capacity, the thickness of the recording tape T is made to be less than or equal to 7.5 μm, and preferably less than or equal to 6.9 μm.

Figure 3:
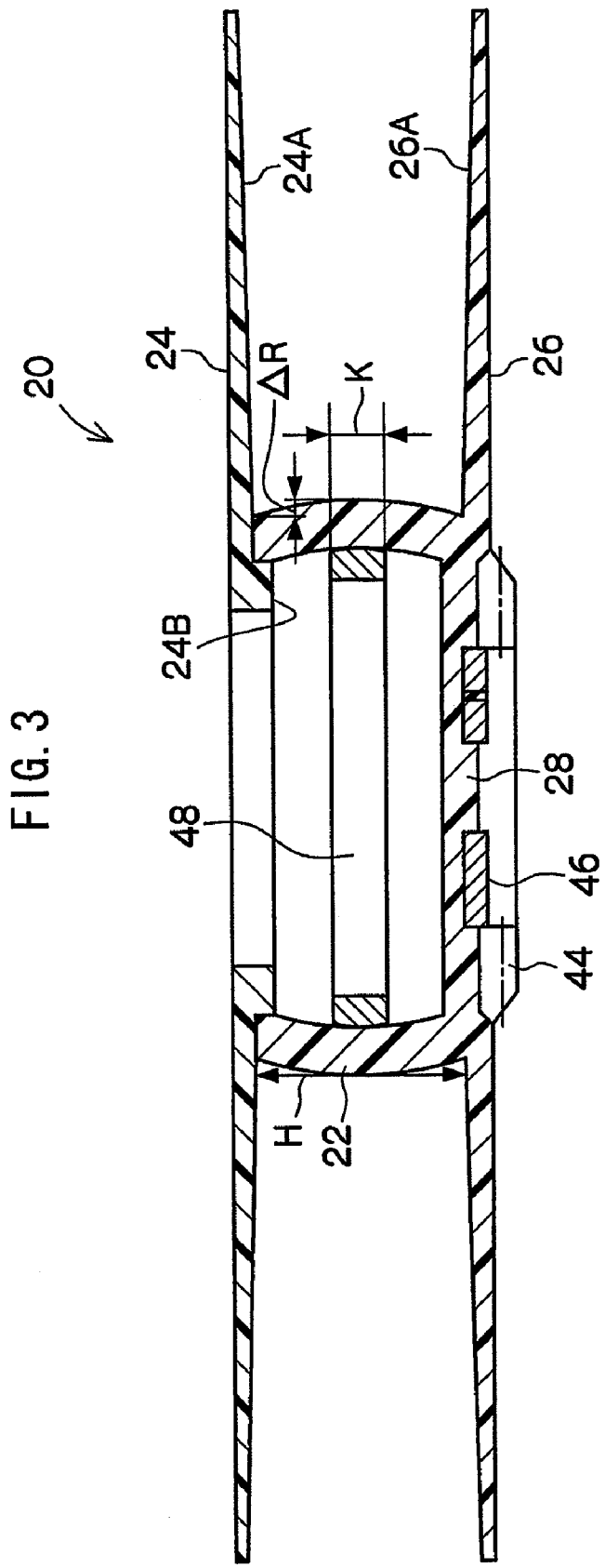
FIG. 3 is a schematic side cross-sectional view of a reel relating to the present embodiment.

Further, as shown in detail in FIG. 3, a ring-shaped member 48, which is formed in a cylindrical shape and which is made of metal or resin, is press-fit in at the inner side (inner peripheral surface side) of the reel hub 22 at the substantially central portion in the width direction. The outer diameter of the ring-shaped member 48 is larger, by a predetermined amount, than the inner diameter of the reel hub 22, and a width (height) K of the ring-shaped member 48 is, for example, about ⅓ of a width H of the reel hub 22. The configuration of the reel hub 22 is thereby made to be a substantially barrel-shaped configuration (hereinafter called "crowning shape" upon occasion) in which, when seen from a side view, the substantially central portion in the width direction swells-out in an arc shape for example (but is not limited to an arc shape).

Note that the width K of the ring-shaped member 48 is approximately greater than or equal to ¼ and less than or equal to ⅝ of the width H of the reel hub 22, and is preferably greater than or equal to ¼ and less than or equal to ¾ thereof. If the width K of the ring-shaped member 48 is less than ¼ of the width H of the reel hub 22, the shape may become stepped, or may become substantially lozenge-shaped, or may become warped. Further, if the width K of the ring-shaped member 48 is greater than ⅚ of the width H of the reel hub 22, there are cases in which the necessary crowning amount (convex amount) ΔR, which will be described later, cannot be obtained.

It is desirable that the outer diameters of the upper and lower both end portions of the reel hub 22 be the same at the upper flange 24 side and the lower flange 26 side, but do not necessarily have to be the same, and it suffices for them to be smaller than the outer diameter of the substantially central portion in the width direction. Further, it is preferable that the rigidity of the reel hub 22 after the press-fitting of the ring-shaped member 48 be high. A flexural modulus E of the reel hub 22 at the portion that the ring-shaped member 48 press-contacts is greater than or equal to 16.0 GPa, and preferably greater than or equal to 19.2 GPa.

Here, given that the plate thickness of the reel hub 22 is a, the flexural modulus of the material thereof is Ea, the plate thickness of the ring-shaped member 48 is b, and the flexural modulus of the material thereof is Eb, the aforementioned flexural modulus E is determined as E=Ea×a/(a+b)+Eb×b/(a+b). Note that the flexural modulus Eb of the ring-shaped member 48 is made to be greater than or equal to the flexural modulus Ea of the reel hub 22. Further, the values 16.0 GPa and 19.2 GPa are based on the results of following Table 1, namely, lower limit values which are computed by supposing that the original values of the flexural moduli Ea, Eb include a dispersion or error of 5% relative to the values of the flexural modulus E in Example 1 and Example 2 of Table 1.

of the measurement positions are set such that the central positions thereof at the time of measurement are within ranges of 0.7 mm to 1.0 mm from the upper end portion and the lower end portion of the reel hub 22 respectively, so that the touch sensor probe 90 does not interfere with the upper flange 24 or the lower flange 26. The measurement points are set at substantially uniform intervals such that the total number thereof is at least 10. This measurement is carried out in the same way at six places which are at 60° intervals.

From these results, the crowning amount ΔR=(ΔRmax+ΔRmin)/2 of the reel hub 22 is computed. Note that ΔRmax is the maximum value of ΔR1 through ΔR6, and ΔRmin is the minimum value of ΔR1 through ΔR6. Further, ΔR1 through ΔR6 are Rnmax−(the greater of the radius values among the radius values of the upper end portion and the lower end portion) (n=1 to 6), at each of the positions of the six places which are at the 60° intervals. Moreover, R1max through R6max are the maximum values among the measured values of the radius at the positions of the six places at the 60° intervals, which are measured by the above-described method.

On the other hand, as shown in FIG. 3, the reel gear 44 is formed in an annular shape at the lower surface of a floor wall 28 of the reel hub 22. A gear opening 40, which is for exposing the reel gear 44 to the exterior, is formed in the central portion of the lower case 16 (see FIG. 2). The reel gear 44, which is exposed from this gear opening 40, meshes-together with a driving gear (not shown) of the drive device 70 (see FIG. 4 and

TABLE 1

| example | a (mm) | b (mm) | Ea (GPa) | Eb (GPa) | E (GPa) | difference (mm) in radii of both ends of reel hub | evaluation of wound posture* |
|---|---|---|---|---|---|---|---|
| 1 | 2.0 | 0.5 | 3.6 | 70.0 | 16.9 | 0.035 | B |
| 2 | 1.5 | 0.5 | 3.6 | 70.0 | 20.2 | 0.038 | B-A |
| 3 | 1.0 | 1.0 | 3.6 | 70.0 | 36.8 | 0.039 | B-A |

*A: very good, B: good, C: somewhat poor, D: poor

The crowning amount (convex amount) ΔR, which is the difference between the radius of the maximum diameter portion (the substantially central portion in the width direction in this case) of the reel hub 22 after the ring-shaped member 48 is press-fit and the radius which is the larger of the radii of the upper and lower both end portions, is ΔR≦0.08 mm, and preferably ΔR≦0.064 mm. Further, a ratio J (J=ΔR/G) of the crowning amount ΔR with respect to a width G of the recording tape T which is prescribed at the drive device 70 side (and in this case is a width of ½ inch and is 12.65 mm, see FIG. 6) is J≦0.0063, and preferably J≦0.0050.

Figure 18:
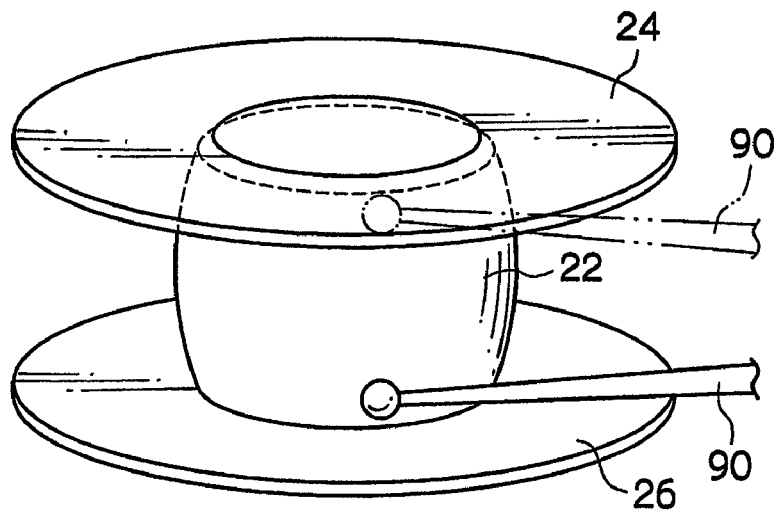
FIG. 18 is a schematic perspective view for explaining a method of measuring the radius of the reel.

A method of measuring the aforementioned crowning amount (convex amount) ΔR will be described next. As shown in FIG. 18, the reel 20 is set on an unillustrated master chucking gear (a highly-accurate reference gear) such that a chucking portion (a reel gear 44 which will be described later) of the reel 20 which is chucked by the drive device 70 is directed downward. Then, in this state, the outer shape of the reel hub 22 is measured from the lower end portion side to the upper end portion side by a touch sensor probe 90 of a contact-type three-dimensional measuring device.

At this time, the provisional center (axial center) at the time of measuring the radius of the reel hub 22 is the center (axial center) of the master chucking gear. Further, because the touch sensor probe 90 which has a diameter of 1 mm is used, the positions of upper end portion and the lower end portion FIG. 5), and is driven and rotated. In this way, the reel 20 is able to rotate relative to the case 12 within the case 12.

A reel plate 46, which is formed in an annular shape of a magnetic material, is fixed by insert molding or the like to the lower surface of the floor wall 28 at the radial direction inner side of the reel gear 44. The reel plate 46 is attracted and held by the magnetic force of an annular magnet (not shown) of the drive device 70. Further, the reel 20 is held so as to not joggle by play restricting walls 42 which serve as inner walls which project-out locally at the inner surfaces of the upper case 14 and the lowercase 16 and are on circular loci which are coaxial with the gear opening 40 (see FIG. 2).

Further, as shown in FIG. 1 and FIG. 2, an opening 18 for the pulling-out of the recording tape T wound on the reel 20 is formed in a right wall 12B of the case 12. A leader pin 30, which is pulled out and operated while being anchored (engaged) by a leader block 85 (see FIG. 4, FIG. 7A and FIG. 7B) which serves as a pull-out member of the drive device 70, is fixed to the free end portion of the recording tape T which is pulled out from the opening 18. Annular grooves 32 are formed in the both end portions of the leader pin 30 which project-out further than the width direction end portions of the recording tape T. These annular grooves 32 are anchored by hooks 85A or the like of the leader block 85 (see FIG. 7A and FIG. 7B).

Further, a pair of upper and lower pin holding portions 36 are provided at the inner side of the opening 18 of the case 12, i.e., at the inner surface of the ceiling plate 14A of the upper case 14 and the inner surface of the floor plate 16A of the lower case 16. The pin holding portions 36 position and hold the leader pin 30 within the case 12. The pin holding portions 36 are formed in substantially semicircular shapes whose recording tape T pull-out sides are open. Both end portions 34 of the leader pin 30, which is in an upright state, can enter into and exit from the pin holding portions 36 from these open sides.

A leaf spring 38 is disposed and fixed in a vicinity of the pin holding portions 36. The distal end portions of a bifurcated portion of the leaf spring 38 respectively engage with the upper and lower end portions 34 of the leader pin 30, such that the leader pin 30 is held in the pin holding portions 36. Note that, when the leader pin 30 is to enter into or exit from the pin holding portions 36, the distal end portions of the leaf spring 38 are appropriately elastically deformed so as to permit movement of the leader pin 30.

The opening 18 is opened and closed by a door 50. The door 50 is structured as a substantially rectangular plate of a size which can close the opening 18. Groove portions 64, into which the upper and lower end portions of the door 50 are slidably fit, are formed in the ceiling plate 14A and the floor plate 16A at the inner side of the opening 18, such that the door 50 can move along the right wall 12B of the case 12.

A shaft 52 is formed to project at the center of the rear end portion of the door 50. A coil spring 58 is fit around the shaft 52. A widened portion 54, which prevents the coil spring 58 from falling-off, is formed at the rear end of the shaft 52. A supporting stand 60, which has an anchor portion 62 which anchors the rear end of the coil spring 58 which is fit around the shaft 52, projects from the lower case 16.

Accordingly, due to the shaft 52 being supported so as to be freely slidable on the supporting stand 60 and the rear end of the coil spring 58 being anchored on the anchor portion 62, the door 50 is always urged in the direction of closing the opening 18 by the urging force of the coil spring 58. Note that it is preferable that a supporting stand 66, which supports the shaft 52 when the opening 18 is open, be formed so as to project-out at the rear side of the supporting stand 60.

A convex portion 56 for opening/closing operation projects outwardly from the front end portion of the door 50. The convex portion 56 engages with an opening/closing member (not shown) of the drive device 70 as the recording tape cartridge 10 is loaded into the drive device 70. The door 50 is thereby opened against the urging force of the coil spring 58.

An example of the drive device 70 into which the recording tape cartridge 10 is loaded will be described next. As shown in FIG. 4 through FIG. 7B, the drive device 70 has the take-up reel 80 on which the recording tape T, which has been pulled out from the recording tape cartridge 10 via the leader pin 30, is wound.

The take-up reel 80 has substantially the same structure as the reel 20. Namely, the take-up reel 80 has a reel hub 82 which is formed in a substantially cylindrical shape having a floor and which structures the axially central portion (core portion) of the take-up reel 80, an upper flange 84 provided at the upper end portion of the reel hub 82, and a lower flange 86 provided at the lower end portion of the reel hub 82. The lower flange 86 and the reel hub 82 are molded integrally.

The upper flange 84 is structured integrally with the upper end portion of the reel hub 82 by being screwed (fixed) thereto via a metal retainer plate (not shown). Note that the mutually-opposing surfaces of the upper flange 84 and the lower flange 86 are taper surfaces 84A, 86A (see FIG. 5) at which the interval between the flanges gradually increases toward the outer side (the outer peripheral edge side).

The recording tape T can be wound on the outer peripheral surface of the reel hub 82, and the width of the fluctuation in the width direction of the wound recording tape T is restricted by the upper flange 84 and the lower flange 86. Further, a substantially-ring-shaped member 68, which is formed in a substantially cylindrical shape and which is made of metal or resin, is press-fit in at the inner side (inner peripheral surface side) of the reel hub 82 at the substantially central portion in the width direction. The outer diameter of the substantially-ring-shaped member 68 is larger, by a predetermined amount, than the inner diameter of the reel hub 82, and the width (height) K of the substantially-ring-shaped member 68 is, for example, about ⅓ of the width H of the reel hub 82.

Note that the width K of the substantially-ring-shaped member 68 is approximately greater than or equal to ¼ and less than or equal to ⅚ of the width H of the reel hub 82, and is preferably greater than or equal to ¼ and less than or equal to ¾ thereof. If the width K of the substantially-ring-shaped member 68 is less than ¼ of the width H of the reel hub 82, the shape may become stepped, or may become substantially lozenge-shaped, or may become warped. Further, if width K of the substantially-ring-shaped member 68 is greater than ⅚ of the width H of the reel hub 82, there are cases in which the necessary crowning amount (convex amount) ΔR cannot be obtained.

Figure 4:
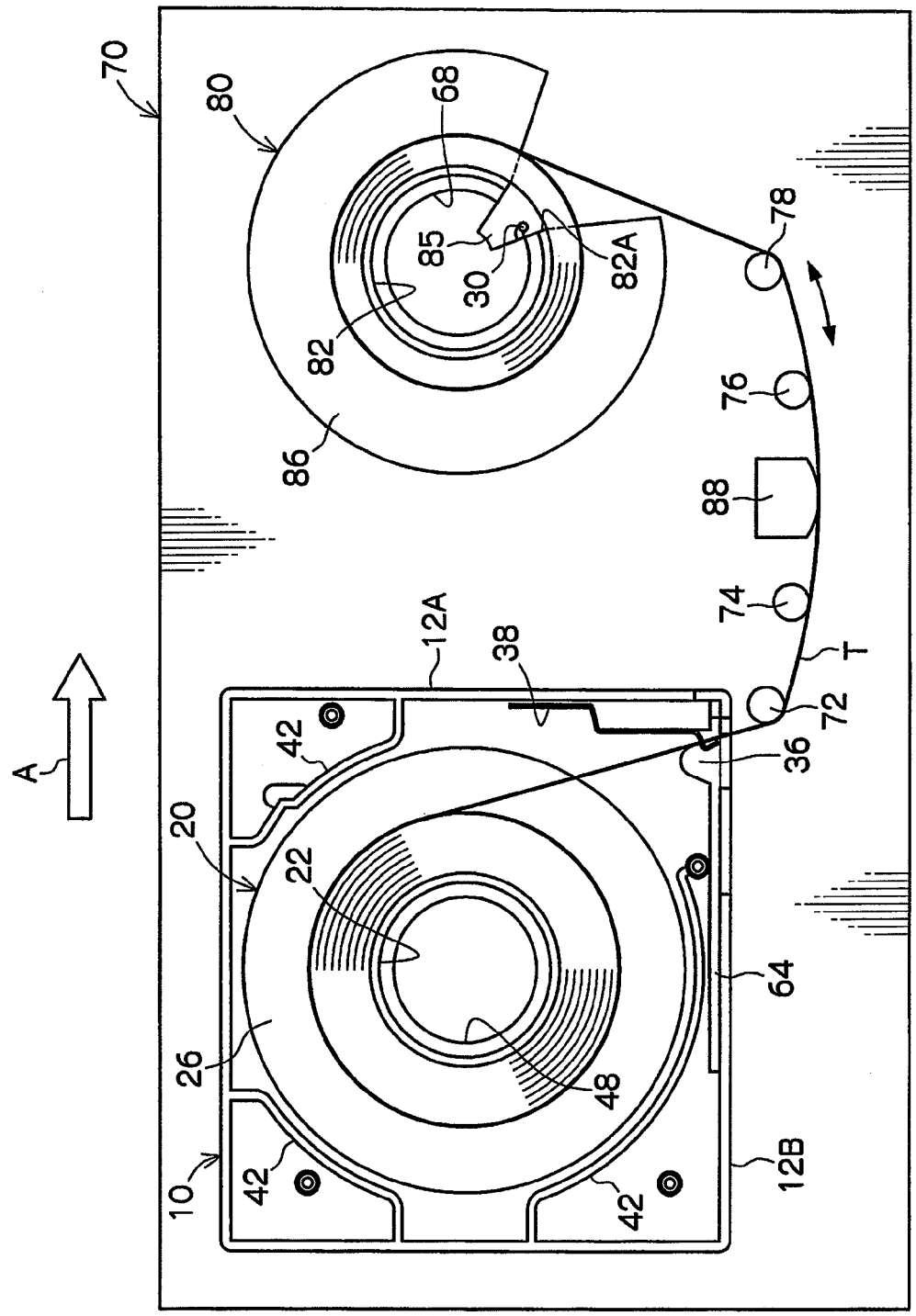
FIG. 4 is a schematic plan view of a drive device after the recording tape cartridge has been loaded therein.
Figure 7A:
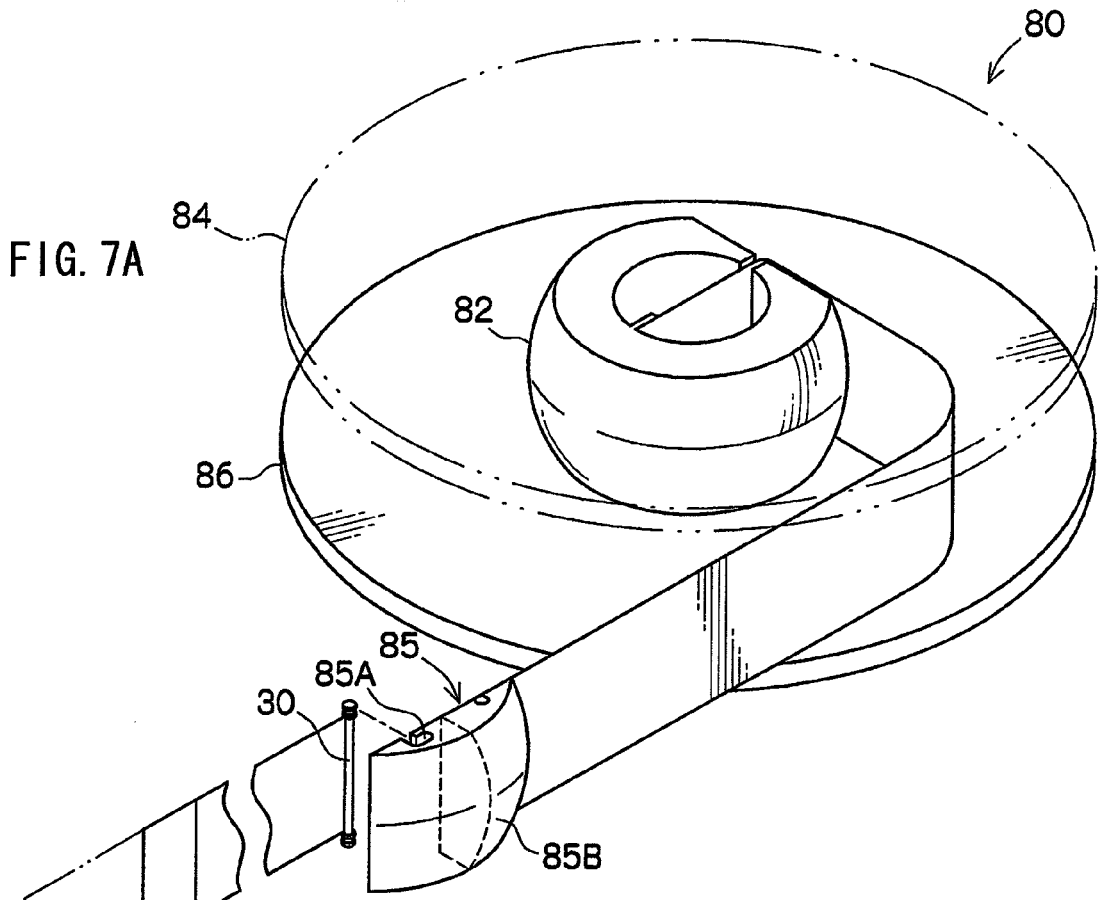
FIG. 7A is a schematic perspective view showing the structure of a pull-out member of a take-up reel.
Figure 7B:
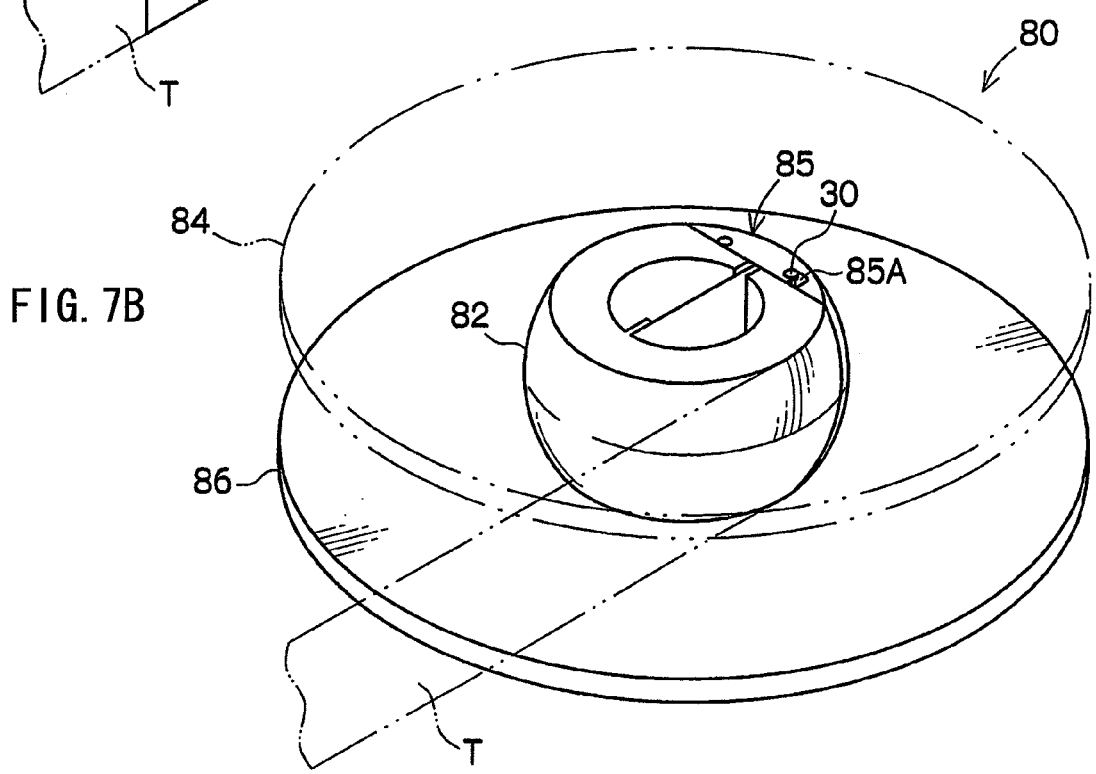
FIG. 7B is a schematic perspective view showing the structure of a pull-out member of a take-up reel.

The reason why the substantially-ring-shaped member 68 is used is because, as shown in FIG. 4, FIG. 7A and FIG. 7B, a slit portion 82A, which accommodates the leader block 85 which grasps the leader pin 30, is formed in the reel hub 82 of the take-up reel 80 in the heightwise direction (the axial direction of the reel hub 82). Namely, the substantially-ring-shaped member 68 is formed substantially in the shape of the letter "C" when seen from a plan view (see FIG. 4).

By press-fitting the substantially-ring-shaped member 68 in, the configuration of the reel hub 82 is made to be a substantially barrel-shaped configuration (crowning shape) in which, when seen from a side view for example, the substantially central portion in the width direction swells-out in an arc shape (but is not limited to an arc shape), in the same way as the reel hub 22. Note that a take-up surface 85B of the leader block 85, which corresponds to the outer peripheral surface of the reel hub 82, also need to be formed in a similar shape so that there is no step between the take-up surface 85B and the substantially barrel-shaped configuration of the outer peripheral surface of the reel hub 82.

It is desirable that the outer diameters of the upper and lower both end portions of the reel hub 82 be the same at the upper flange 84 side and the lower flange 86 side, but do not necessarily have to be the same, and it suffices for them to be smaller than the outer diameter of the substantially central portion in the width direction. Further, it is preferable that the rigidity of the reel hub 82 after the press-fitting of the substantially-ring-shaped member 68 be high. The flexural modulus E of the reel hub 82 at the portion that the substantially-ring-shaped member 68 press-contacts is, in the same way as the reel 20, greater than or equal to 16.0 GPa, and preferably greater than or equal to 19.2 GPa. Note that these points, as well as the point that the flexural modulus $E_b$ of the substantially-ring-shaped member 68 is greater than or equal to the flexural modulus $E_a$ of the reel hub 82, and the like, are the same as in the case of the reel 20, and therefore, detailed description thereof will be omitted.

Figure 5:
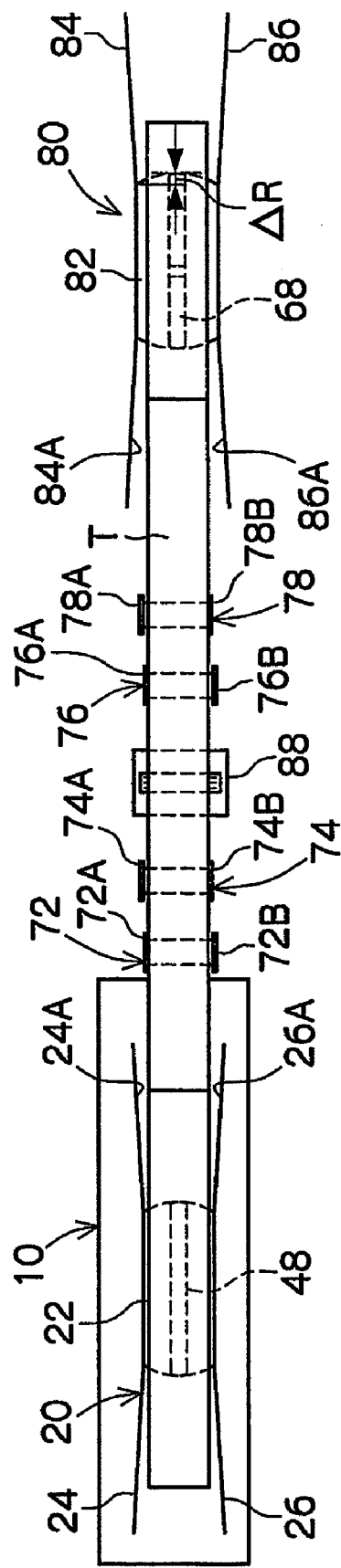
FIG. 5 is a schematic side view of the drive device after the recording tape cartridge has been loaded therein.

Further, as shown in FIG. 5, the crowning amount (convex amount) ΔR, which is the difference between the radius of the maximum diameter portion (the substantially central portion in the width direction in this case) of the reel hub 82 after the substantially-ring-shaped member 68 is press-fit and the radius which is the larger of the radii of the upper and lower both end portions, is $\Delta R \leq 0.08$ mm, and preferably $\Delta R \leq 0.064$ mm. Further, the ratio J ($J=\Delta R/G$) of the crowning amount $\Delta R$ with respect to the width G of the recording tape T which is prescribed at the drive device 70 side (and in this case is 12.65 mm) is $J \leq 0.0063$, and preferably $J \leq 0.0050$. These points as well are the same as in the case of the reel 20.

Next, operation of the recording tape cartridge 10, which has the recording tape T and the reel 20 of the above-described structure, and the drive device 70 which has the take-up reel 80, will be described. As shown in FIG. 1, at times of non-use (during storage, transporting, or the like) when the recording tape cartridge 10 having the above-described structure is not loaded in the drive device 70 (see FIG. 4 through FIG. 6), the opening 18 is closed by the door 50. When the recording tape T is to be used, the recording tape cartridge 10 is loaded into the drive device 70 along the direction of arrow A with its front wall 12A leading.

The recording tape cartridge 10 is inserted into an unillustrated bucket, and an opening/closing member (not shown) provided at the bucket (the drive device 70 side) engages with the convex portion 56 of the door 50. In this state, when the recording tape cartridge 10 moves further in the direction of arrow A, the opening/closing member moves the convex portion 56 relatively rearward against the urging force of the coil spring 58. In this way, the door 50, from which the convex portion 56 projects-out, slides rearward within the groove portions 64 and along the right wall 12B, and opens the opening 18.

When the recording tape cartridge 10 is loaded in the drive device 70 (the bucket) to a predetermined depth and the opening 18 is completely opened in this way, the bucket which is accommodating the recording tape cartridge 10 is lowered a predetermined height, and positioning members (not shown) of the drive device 70 are inserted relatively into hole portions for positioning (not shown) which are formed in the lower case 16. In this way, the recording tape cartridge 10 is positioned accurately at a predetermined position within the drive device 70, and further sliding of the door 50 (further movement of the door 50 rearward) is restricted.

Due to the movement of the recording tape cartridge 10 (the bucket) being lowered, the driving gear (not shown) relatively enters-in from the gear opening 40, meshes-together with the reel gear 44, and raises the reel 20 to a predetermined height. Then, in the state in which the driving gear and the reel gear 44 are completely meshed-together, the reel plate 46 is attracted and held by the magnetic force of an annular magnet (not shown) which is provided at the inner side of the driving gear. In this way, the reel 20 is set in a lock released state in which it can rotate relative to the case 12 within the case 12, while the meshing-together of the reel gear 44 with the driving gear is maintained.

On the other hand, the leader block 85 which is provided at the drive device 70 side enters into the case 12 from the opening 18 which has been opened, and grasps and pulls out the leader pin 30 which is positioned and held at the pin holding portions 36. Note that, because the recording tape cartridge 10 is accurately positioned within the drive device 70 at this time, the hooks 85A of the leader block 85 can reliably be made to anchor the annular grooves 32 of the leader pin 30. Further, because the rotation locked state of the reel 20 is released, the reel 20 can rotate as the leader pin 30 is pulled out.

The leader block 85, which is grasping the leader pin 30 which is pulled out from the opening 18 in this way, is attached to (accommodated at) the reel hub 82 so as to structure a portion of the reel hub 82 as shown in FIG. 7A and FIG. 7B. Then, by rotating and driving the take-up reel 80 and the reel 20 synchronously, the recording tape T is successively pulled out from the case 12 while being taken-up onto the take-up reel 80.

At this time, the recording tape T which is pulled out from the interior of the case 12 slidingly-contacts a tape guide 72 which is disposed nearest to the recording tape cartridge 10. The tape guide 72 is supported so as to rotate freely, and is assembled such that the heightwise position thereof is offset toward the center or toward one of the upper and lower positions, e.g., toward the lower position.

Accordingly, the recording tape T which slidingly-contacts the tape guide 72 travels in a state in which the edge of the upper end thereof is restricted by an upper flange 72A of the tape guide 72. Next, the recording tape T slidingly-contacts a tape guide 74 which is supported so as to rotate freely. The tape guide 74 is assembled such that the central position thereof in the width direction (heightwise direction) is offset to a position upward of the central position of the reel hub 22 in the width direction (heightwise direction). The edge of the lower end of the recording tape T is restricted by a lower flange 74B of the tape guide 74.

Then, the recording tape T, whose position is restricted by the tape guide 74, next slidingly-contacts a tape guide 76 which is supported so as to rotate freely. Note that, before slidingly-contacting the tape guide 76, the recording tape T slidingly-contacts a recording/playback head 88. Oppositely of the tape guide 74, i.e., in the same way as the tape guide 72, the tape guide 76 is assembled such that the central position thereof in the width direction (heightwise direction) is offset to a position downward of the central position of the reel hub 22 in the width direction (heightwise direction). The edge of the upper end of the recording tape T is restricted by an upper flange 76A of the tape guide 76.

The recording tape T, whose position is restricted by the tape guide 76, then finally slidingly-contacts a tape guide 78 which is supported so as to rotate freely. In the same way as the tape guide 74, the tape guide 78 is assembled such that the central position thereof in the width direction (heightwise direction) is offset to a position upward of the central position of the reel hub 22 in the width direction (heightwise direction). The edge of the lower end of the recording tape T is restricted by a lower flange 78B of the tape guide 78.

When the heightwise positions (width direction positions) of the respective tape guides 72 through 78 within the drive device 70 differ alternately along the tape path of the recording tape T in this way, there is the advantage that restricting of the width direction (vertical direction) position of the recording tape T can be carried out suitably. Note that, because the respective tape guides 72 through 78 are each supported so as to rotate freely, the edges of the recording tape T are seldom damaged by the respective tape guides 72 through 78.

Recording or playback of information is carried out due to the recording tape T slidingly-contacting the recording/playback head 88, which is disposed between the predetermined tape guides 74, 76, while the width direction (vertical direction) position of the recording tape T is restricted by the tape guides 72 through 78. Here, the recording/playback head 88 is supported so as to be able to move in the vertical direction (the heightwise direction) by, for example, an unillustrated actuator, and can move in the width direction of the recording tape T (the axial direction of the reel hubs 22, 82) following servo signals S (see FIG. 6) which are provided in advance on the recording tape T.

As shown in FIG. 6 for example, the servo signal S includes four (or five or the like) patterns P which are lined-up in parallel, and the patterns P are set in a substantially truncated V-shaped arrangement so as to form one group. A plurality of these groups of servo signals S which are formed in substantial truncated V-shapes are disposed in one line in a vicinity of each of the upper and lower end portions of the recording tape T, such that the widening sides thereof face outwardly.

It can be understood that, in accordance with such servo signals S, if the sensing time (distance) in one group of servo signals S (shown by W in FIG. 6) is long, the position of the recording tape T which is traveling is offset one of upward and downward with respect to the recording/playback head 88. Therefore, the vertical direction (heightwise direction) position of the recording/playback head 88 can be adjusted in accordance therewith.

In the present exemplary embodiment, because the reel hub 22 of the reel 20 and the reel hub 82 of the take-up reel 80 are both formed in crowning shapes, fluctuations in the position of the recording tape T in the vertical direction (the axial direction of the reel 20 and the take-up reel 80) are suppressed suitably as will be described in detail later. Accordingly, the traveling position of the recording tape T can be stabilized, and the occurrence of errors in reading the servo signals S (servo tracking errors) and recording/playback errors of data signals (information) can be reduced.

The recording tape T, at which the recording or playback of information has been completed without errors due to the recording tape T slidingly-contacting the recording/playback head 88 while the heightwise position (width direction position) thereof is restricted by the respective tape guides 72 through 78 and the configurations of the reel hubs 22, 82 of the reel 20 and the take-up reel 80, is rewound onto the reel 20 due to the driving gear and the take-up reel 80 rotating reversely.

When the recording tape T is rewound on the reel 20 to the end and the leader pin 30 is held at the pin holding portions 36, the bucket accommodating the recording tape cartridge 10 rises a predetermined height, the positioning members (not shown) are pulled out from the hole portions for positioning (not shown), the driving gear is pulled out from the gear opening 40, and the meshing of the driving gear with the reel gear 44 is cancelled. Then, the reel 20 moves downward to its original heightwise position within the recording tape cartridge 10.

Thereafter, the recording tape cartridge 10 is moved in the direction opposite to the direction of arrow A by an unillustrated ejecting mechanism. Accompanying this movement, the door 50 slides in the direction of closing the opening 18 due to the urging force of the coil spring 58, and completely closes the opening 18 (returns to the initial state). The recording tape cartridge 10, whose opening 18 is closed in this way, is completely ejected from the drive device 70 (the bucket).

The method of manufacturing of and the operation and effects of the above-described reel 20 and take-up reel 80 will be described in detail next. Note that the method of manufacturing of and the operation and effects of the take-up reel 80 are substantially the same as the method of manufacturing of and the operation and effects of the reel 20. Namely, the ring-shaped member 48 which is annular is press-fit into the reel hub 22, and the substantially-ring-shaped member 68 which is substantially C-shaped in plan view is press-fit into the reel hub 82, but the operation and effects of the ring-shaped member 48 and the substantially-ring-shaped member 68 are substantially the same. Therefore, hereinafter, only description of the reel 20 will be given, and description of the take-up reel 80 will be omitted fittingly.

As shown in FIG. 3 and FIG. 8A, the reel hub 22 is formed integrally with the lower flange 26, and the upper flange 24 is provided by welding at the upper surface of the reel hub 22. Before welding of the upper flange 24, the ring-shaped member 48, which is a predetermined height K (e.g., a width K which is about ⅓ of the width H of the reel hub 22) and whose outer diameter is a predetermined amount larger than the inner diameter of the reel hub 22 at the lower flange 26 side end portion thereof, is disposed by press-fitting at the inner peripheral surface side of the reel hub 22 at the substantially central portion in the width direction.

Note that, at this time, the reel hub 22 is molded in advance (preformed) such that the outer diameter of the upper flange 24 side end portion of the reel hub 22 is smaller by a predetermined amount L than the outer diameter of the lower flange 26 side end portion thereof. If the reel hub 22 is preformed in such a configuration in advance, at the time of press-fitting the ring-shaped member 48 in at the inner side of the reel hub 22, the outer diameter of the upper flange 24 side end portion and the outer diameter of the lower flange 26 side end portion can be made to be substantially equal (a balance is obtained between the outer diameters of the upper and lower end portions). Further, it is also possible to provide a difference in diameters by providing intended, predetermined dimensions (see FIG. 8B).

Namely, in this way, the reel hub 22 can be formed in a good substantial barrel shape (crowning shape) in which, for example, the outer diameters of the upper and lower both end sides are substantially equal, and the outer diameter of the substantially central portion in the width direction is larger than the outer diameters at the end portions at the upper flange 24 side and the lower flange 26 side (the upper and lower both end portion sides). Note that, because the press-fit margin of the ring-shaped member 48 is 0.005 mm to 0.060 mm, the ring-shaped member 48 can be sufficiently press-fit in merely by forming a chamfered portion 22A at the upper end portion of the inner peripheral side of the reel hub 22. Further, at this time, if the outer peripheral surface of the ring-shaped member 48 is formed as a predetermined arc-shaped surface when seen from a side view, it is even easier to press-fit the ring-shaped member 48 in at the inner side (the inner peripheral surface side) of the reel hub 22, and the shape of the reel hub 22 can be formed in an even better substantial barrel shape (crowning shape).

Further, although not illustrated, a braking member and the like are provided within the reel hub 22 so that the reel 20 does not rotate when not in use. Therefore, as shown in FIG. 8A and FIG. 8B, plural standing ribs 23, which restrict the position of the braking member, are formed at the inner peripheral surface of the reel hub 22 at uniform intervals. Accordingly, by prescribing the heights of the standing ribs 23, the position at which the ring-shaped member 48 is disposed can be restricted to the substantially central portion in the width direction.

Namely, because it suffices to press-fit the ring-shaped member 48 in until it abuts the standing ribs 23, the press-fitting process can be simplified. Note that the inner diameter of the ring-shaped member 48 is either the same as or larger than the inner diameter of the portion prescribed by the radial direction inner side end surfaces of the standing ribs 23 (in the illustrated structure, these inner diameters are the same). In this way, the aforementioned braking member and the like can be made to not interfere with the ring-shaped member 48. Further, it is preferable that at least the portions of the upper end portions of the standing ribs 23, which portions are abutted by the ring-shaped member 48, are made to be flat so that the position of the ring-shaped member 48 is determined accurately.

The material of the ring-shaped member 48 is preferably metal, and is preferably aluminum, stainless steel, plated steel, copper, brass or the like so that the ring-shaped member 48 does not rust. It is preferable that aluminum be subjected to alumite treatment. Note that the ring-shaped member 48 is not limited to being made of metal, and may be molded, for example, of the same resin material as the reel hub 22 provided that the plate thickness of the ring-shaped member 48 is formed to be thick. In this case, the ring-shaped member 48 is easily press-fit in at the inner side (inner peripheral surface side) of the reel hub 22. In any case, the modulus of elasticity of the ring-shaped member 48 is preferably greater than or equal to the modulus of elasticity of the reel hub 22. In this way, the rigidity of the reel hub 22 can be improved.

The reel 20 having the substantially barrel-shaped reel hub 22 is manufactured in this way. In accordance with the reel 20, because the recording tape T is wound while being set toward the substantially central portion in the width direction (the maximum diameter portion) of the reel hub 22, the regulated windability can be improved. FIG. 15A through FIG. 16B are wound posture measurement charts showing the edge position, in the radial direction of the reel 20, of the recording tape T which is wound on the reel hub 22. Note that FIG. 15A and FIG. 16A show cases of the reel 20 in which the interval between the flanges is similar to that of a conventional reel, and FIG. 15B and FIG. 16B show the reel 20 in which the interval between the flanges is made to be more narrow than is the case conventionally (the reel 20 in which a clearance C, which is equal to the width of the reel hub 22 minus the width of the recording tape T, is C=0.10 mm to 0.18 mm).

Further, FIG. 15A and FIG. 15B show cases in which the recording tape T is wound on a conventional reel hub (not shown) which is not formed in a crowning shape (is actually slightly hourglass-shaped, and when expressing a hourglass shape as negative with respect to a barrel shape, $\Delta R = -16\,\mu m$). FIG. 16A and FIG. 16B show cases in which the recording tape T is wound on the reel hub 22 whose crowning amount $\Delta R$ is $\Delta R = 58\,\mu m$. Note that the "maximum step/protrusion amount" shown in FIG. 15A for example is the maximum value of either of the step or the protrusion amount of the wound posture measurement chart, and is the maximum value of the amount of change by which the recording tape T protrudes-out locally from the overall wound surface. Further, "amount of disorder in winding" is an amount computed by subtracting the minimum value from the maximum value of the wound posture measurement chart, and includes steps, protrusion, tilting of the wound surface, and the like.

Figure 17:
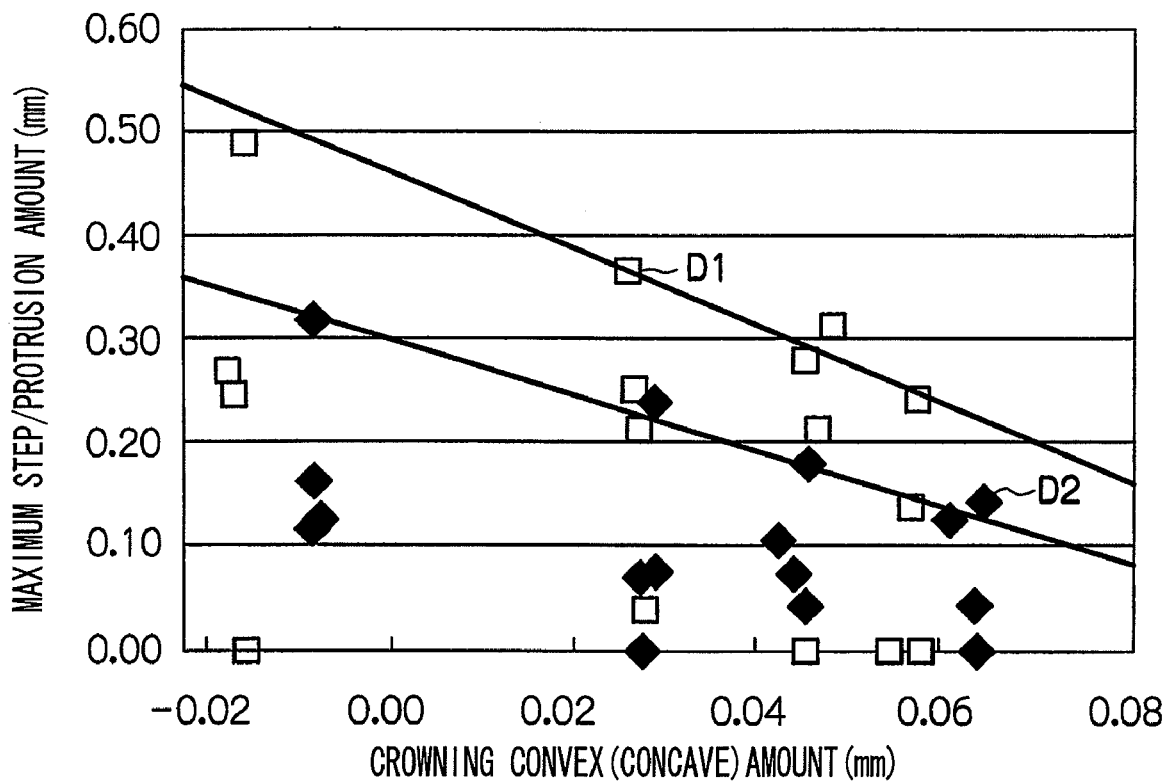
FIG. 17 is a graph showing the relationship between a crowning amount and a maximum step/protrusion amount.

FIG. 17 is a graph showing the relationship between the crowning amount (convex amount) $\Delta R$ and the maximum step/protrusion amount. Namely, the crowning amount (convex amount) $\Delta R$ is on the horizontal axis, and the maximum step/protrusion amount is on the vertical axis. Further, the white, square dot D1 shows the case of the reel 20 whose interval between flanges is similar to that of the conventional reel. The black, diamond-shaped dot D2 shows the case of the reel 20 in which the interval between the flanges is made to be more narrow than is the case conventionally (the reel 20 in which the clearance C, which is equal to the width of the reel hub 22 minus the width of the recording tape T, is C=0.10 mm to 0.18 mm).

Following Table 2 shows reduced values of the maximum step/protrusion amount in accordance with changes in the crowning amount (convex amount) $\Delta R$, and the reduced values of the maximum step/protrusion amount in accordance with differences in the interval between the flanges (for the interval between the flanges of a first reel, the clearance C is, for example, C=0.30 mm), respectively in cases which are based on the maximum step/protrusion amount at the reel hub of the first reel (not shown) which is not formed in a crowning shape (is actually slightly hourglass-shaped, and when expressing a hourglass shape as negative with respect to a barrel shape, $\Delta R = -16\,\mu m$), and the maximum step/protrusion amount at the reel hub of a second reel (not shown) which is not formed in a crowning shape (is actually slightly hourglass-shaped, and when expressing a hourglass shape as negative with respect to a barrel shape, $\Delta R = -8\,\mu m$) and at which the interval between the flanges is made to be narrow (the clearance C is, for example, C=0.15 mm).

TABLE 2

| reel + convex amount $\Delta R$ (μm) | maximum step/protrusion amount (mm) | difference with first reel ($\Delta R = -16\,\mu m$, C = 0.30 mm) | difference with second reel ($\Delta R = -8\,\mu m$, C = 0.15 mm) | state of wound surface* |
|---|---|---|---|---|
| First Reel | 0.487 | | | |
| + convex amount 27-30 | 0.368 | 0.119 (−24%) | | A |
| + convex amount 46-49 | 0.310 | 0.177 (−36%) | | A |
| + convex amount 55-64 | 0.242 | 0.245 (−50%) | | A |
| Second Reel | 0.323 | 0.164 (−33%) | | A |
| + convex amount 27-30 | 0.238 | 0.294 (−60%) | 0.085 (−26%) | A |
| + convex amount 46-49 | 0.184 | 0.303 (−62%) | 0.139 (−43%) | A |
| + convex amount 55-64 | 0.140 | 0.347 (−71%) | 0.183 (−57%) | A |

*A: good (no cinching, radiating), B: poor (cinching and radiating exhibited)

The following can be understood from the results of FIG. 15A through FIG. 17 and Table 2. Namely, even if the interval between the flanges is wide (even if C=0.30 mm) as is the case with the conventional reel, if there is even a slight crowning amount $\Delta R$ (e.g., even if $\Delta R \leq 0.064$ mm (64 μm)), the interval between the flanges can be narrowed well by the deformation of the reel hub 22 due to the tight-winding of the recording tape T. Therefore, the maximum step/protrusion amount and the amount of disorder in winding can be sufficiently reduced. Further, at the reel 20 at which the interval between the flanges is made narrow from the start (C=0.15 mm), the effect can be even further improved.

In this way, at the reel 20 at which the upper and lower flanges 24, 26 are provided integrally with the reel hub 22, if a crowning shape (substantial barrel shape) is given to the reel hub 22, even if the crowning amount (convex amount) $\Delta R$ is rather small ($\Delta R \leq 0.08$ mm, see FIG. 17), the step or protrusion amount of the wound surface (amount of disorder in winding) of the recording tape T can be made to be much smaller. This is because, at the reel 20 at which the upper and lower flanges 24, 26 are provided integrally with the reel hub 22, as the reel hub 22 deforms due to tight-winding of the recording tape T, the upper and lower flanges 24, 26 deform such that the interval therebetween narrows.

As described above, at the reel 20, it is proved that there are effects even if the crowning amount ΔR is ΔR≦0.08 mm (80 μm), and preferably, ΔR≦0.064 mm (64 μm). However, it has been empirically confirmed that, if ΔR<0.007 mm (7 μm), or, expressed in terms of the ratio J, if J<0.00055, there is the concern that the effect of guiding the recording tape T to the substantially central portion in the width direction of the reel hub 22 will be small.

Further, it has been empirically confirmed that, if the crowning amount ΔR is ΔR>0.08 mm (80 μm), or, expressed in terms of the ratio J, if J>0.0063, there is an increased probability that, at the wound surface of the recording tape T in a vicinity of the outer peripheral surface of the reel hub 22, plastic deformation of the recording tape T itself which is called radiating, cinching, undulating, or the like, or gaps between the layers of the recording tape T, will arise at the reel 20 at which the upper and lower flanges 24, 26 are provided integrally with the reel hub 22.

Moreover, in the range in which the crowning amount ΔR is 0.064 mm (64 μm)<ΔR≦0.08 mm (80 μm), or, expressed in terms of the ratio J, 0.0050<J≦0.063, there is no particular problem, but it is easy to be affected by the thickness of the recording tape T and the rigidity of the reel hub 22. In order to reliably ensure the quality of the tape edges, it is preferable that ΔR≦0.064 mm (64 μm), or, expressed in terms of the ratio J. J≦0.0050.

Note that the numerical figures in these experimental data are a case in which the thickness of the recording tape T is less than or equal to 7.5 μm. If the recording tape T is thicker, these numerical figures also will change. In a case in which a recording tape T of a thickness of at least 6.6 μm was wound on a reel hub 22 which was made of 10% glass fiber reinforced PC resin and had a wall thickness of 2.5 μm, radiating and the like did not arise at the wound surface when the crowning amount ΔR was to around ΔR=0.08 mm. However, it has been empirically confirmed that, when greater than that, deformation in an undulating shape, cinching, and the like arose. In this way, the thickness of the recording tape T being thin has a high possibility of affecting the occurrence of deformation in an undulating shape and cinching.

Further, in accordance with the reel 20, at times of winding the recording tape T on the reel hub 22 (including the time of manufacturing the reel 20 and times of rewinding the recording tape T to remove it from the drive device 70), the recording tape T can be wound so as to be set toward the substantially central portion in the width direction of the reel hub 22, and the maximum step/protrusion amount and the amount of disorder in winding can be reduced. Therefore, even if an impact is applied to the recording tape cartridge 10 (the reel 20) at the time of being transported or at the time of being handled, the occurrence of the problem of the edges of the recording tape T being bent (tape edge damage) can be prevented.

Making the thickness of the recording tape T thicker does not present any particular problems because the rigidity thereof is ensured. However, in order to increase the recording capacity per recording tape cartridge 10, there has been the trend to make recent recording tapes T thinner, and there is the concern that the rigidity will decrease, i.e., the edge strength will decrease and it will be easy for the recording tape T to deform plastically. However, at the reel 20 relating to the present exemplary embodiment, it is possible to reduce the frequency of occurrence of the protruding of a single layer (or plural layers) of the recording tape T in which a single layer (or plural layers) of the recording tape T protrudes from the wound surface. Therefore, even if the recording tape T is made to be thin (e.g., even if it is made to be 6.6 μm), tape edge damage can be prevented from occurring.

When the drive device 70 causes the recording tape T to travel, the recording tape T travels in a state of being set toward the substantially central portion in the width direction (the maximum diameter portion) of the reel hub 82 of the take-up reel 80. Therefore, the traveling position of the recording tape T, which is drawn-out from the reel 20, can be stabilized at the appropriate position. Namely, positional fluctuations in the vertical direction (the axial direction of the reel hub 82) while the recording tape T is traveling can be suppressed.

Accordingly, tape edge damage, such as bending of the edges or the like which arises due to contact with the tape guides 72 through 78 or the flanges 84, 86 of the take-up reel 80 provided at the drive device 70, or with the flanges 24, 26 of the reel 20, as well as generation of abraded powder due thereto, can be prevented. In particular, abraded powder may not only stick to the recording tape T and cause errors and drop-out, but also may stick to the recording/playback head 88 and cause more serious trouble. Therefore, it is extremely effective to be able to prevent this. Accordingly, even at high-density-recording drive devices 70, the occurrence of errors in reading the servo signals S (servo tracking errors) and recording/playback errors of data signals (information) can be reduced. In addition, position error signals and off-tracking can be reduced.

Figure 9A:
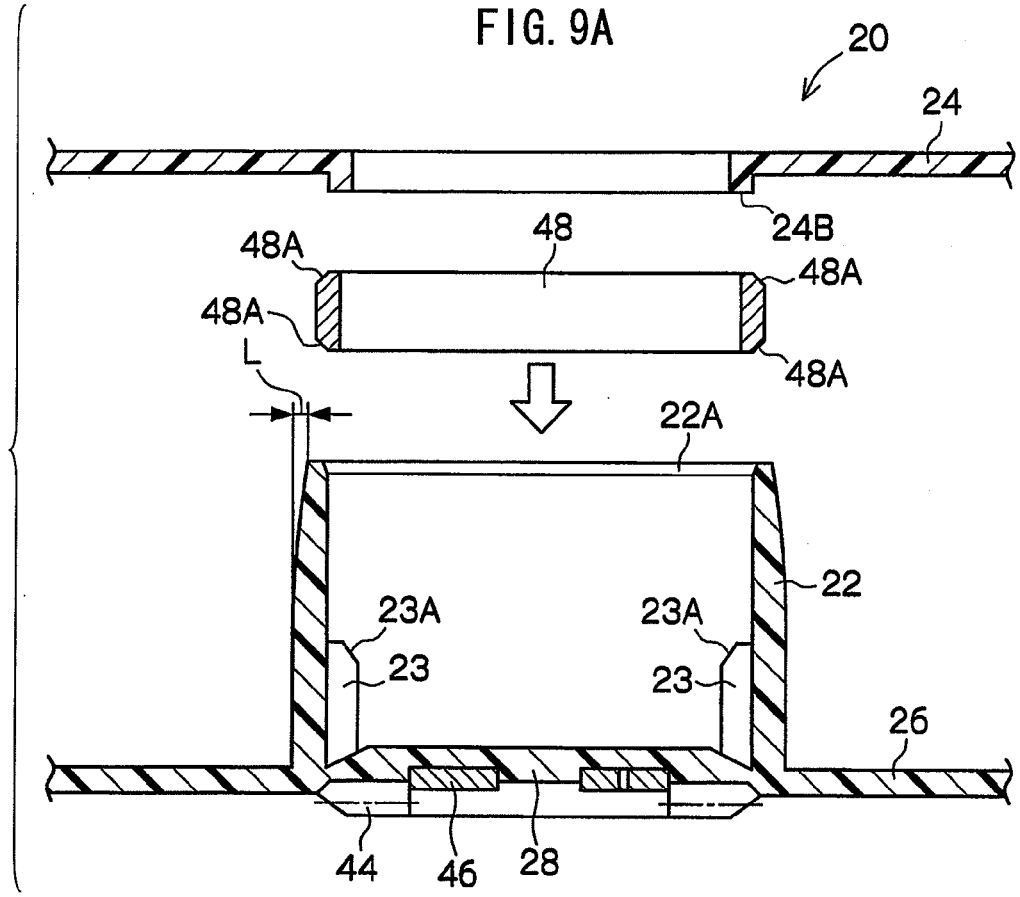
FIG. 9A is a schematic side view explaining a method of manufacturing another reel.
Figure 9B:
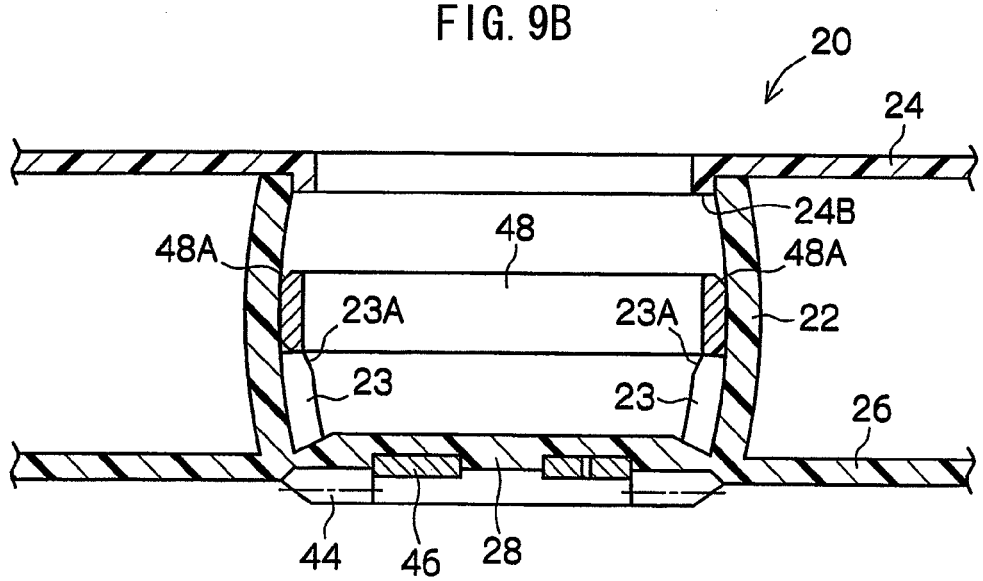
FIG. 9B is a schematic side view explaining a method of manufacturing another reel.

Modified examples of the reel 20 will be described next. Note that, in FIG. 9A through FIG. 14, regions which are the same as those described in FIG. 8A and FIG. 8B are denoted by the same reference numerals, and detailed description thereof is omitted. As shown in FIG. 9A and FIG. 9B, in this first modified example, the outer peripheral surface of the ring-shaped member 48 is formed to be straight, and chamfered portions 48A are formed at the upper side outer peripheral edge portion and the lower side outer peripheral edge portion thereof. Further, taper portions 23A of a predetermined angle are formed at the upper end portions of the radial direction inner sides of the standing ribs 23. After the ring-shaped member 48 is press-fit in at the inner side of the reel hub 22, the inner peripheral surface of the ring-shaped member 48 becomes flush, when seen from a side view, with the upper end portions of the taper portions 23A.

With such a structure, when the ring-shaped member 48 is press-fit in, the standing ribs 23 can be made to be substantially the same shape as that of conventional standing ribs (not shown). Namely, when the recording tape cartridge 10 is not in use, radial direction movement of the brake member can be restricted by the standing ribs 23. When the recording tape cartridge 10 is being used, the brake member, which is supported upward of the taper portions 23A, can reliably be prevented from interfering with the ring-shaped member 48. Note that, because the press-fit margin of the ring-shaped member 48 is 0.005 mm to 0.060 mm, the ring-shaped member 48 can be sufficiently press-fit in merely by forming the chamfered portion 22A at the upper end portion of the inner peripheral side of the reel hub 22.

As examples of concrete dimensions of the reel 20 shown in FIG. 9A and FIG. 9B, the outer diameter of the reel hub 22 is approximately φ44 mm, and the inner diameter is approximately φ40 mm. Accordingly, the plate thickness of the reel hub 22 is 2 mm. Further, the height at the outer peripheral surface of the reel hub 22 is approximately 12.8 mm. On the other hand, the outer diameter of the ring-shaped member 48 is approximately φ40.08 mm (the press-fit margin is approximately 0.04 mm), and the height is 5 mm (or 3 mm). The ring-shaped member 48 is press-fit in at the inner side of the reel hub 22 such that the lower end surface thereof is positioned at a height of approximately 9.4 mm from the upper end surface of the reel hub 22.

Figure 10A:
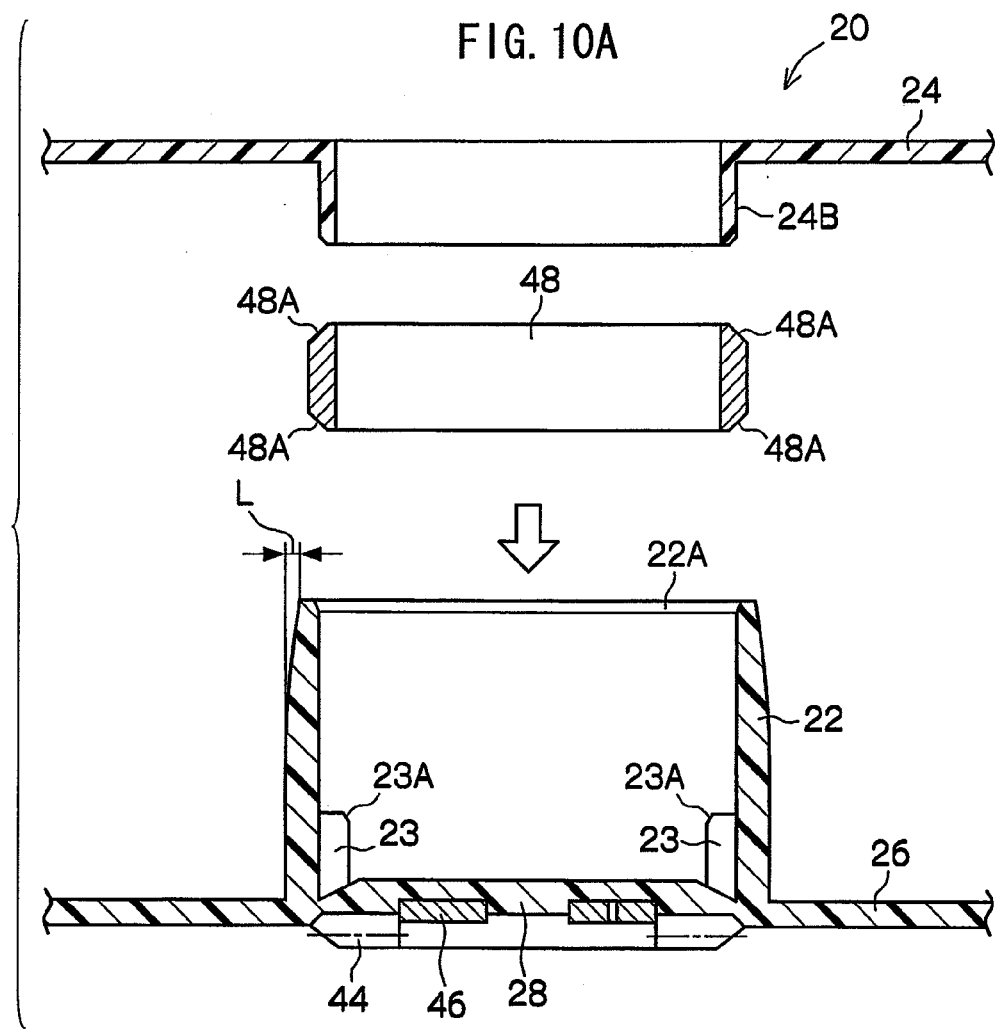
FIG. 10A is a schematic side view explaining a method of manufacturing another reel.
Figure 10B:
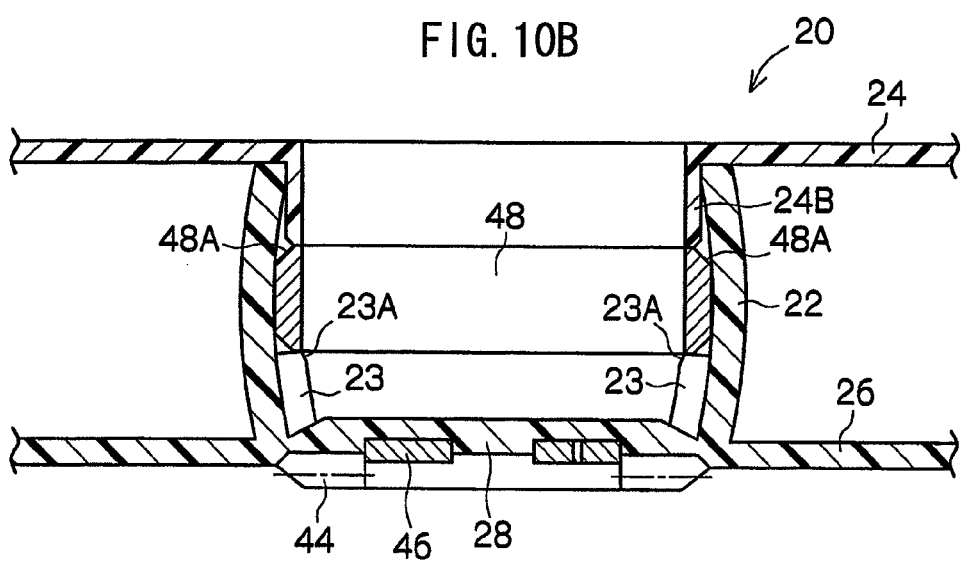
FIG. 10B is a schematic side view explaining a method of manufacturing another reel.

In a second modified example shown in FIG. 10A and FIG. 10B, the height (width K) of the ring-shaped member 48 is formed to be slightly higher than those shown in FIG. 8A through FIG. 9B. After the ring-shaped member 48 is press-fit in, the ring-shaped member 48 is restrained from above by the boss portion 24B of the upper flange 24. Namely, the height of the boss portion 24B of the upper flange 24 as well is extended to a height such that it can abut the upper end portion of the ring-shaped member 48 when the upper flange 24 is welded to the upper end portion of the reel hub 22.

In accordance with such a structure, there is the effect that, when an impact is applied to the recording tape cartridge 10 (the reel 20) due to the recording tape cartridge 10 being dropped or the like, separation and movement of the ring-shaped member can be deterred by the upper flange 24. Note that, because structures and effects other than these are substantially the same as those of the reel 20 shown in FIG. 9A and FIG. 9B, the same reference numerals are applied thereto and detailed description thereof is omitted.

In a third modified example shown in FIG. 11A and FIG. 11B, the height (width K) of the ring-shaped member 48 is formed to be substantially the same as or slightly lower than the height (width H) of the reel hub 22. After the ring-shaped member 48 is press-fit in, the ring-shaped member 48 is restrained from above by the boss portion 24B of the upper flange 24. Accordingly, in this case, the heights of the standing ribs 23 are formed to be low.

In accordance with such a structure, the overall rigidity of the reel hub 22 can be increased, and vicinities of the upper and lower both end portions of the reel hub 22 can be formed in good substantial arc-shaped configurations. Note that, because structures and effects other than these are substantially the same as those of the reels 20 shown in FIG. 9A through FIG. 10B, the same reference numerals are applied thereto and detailed description thereof is omitted.

Figure 12A:
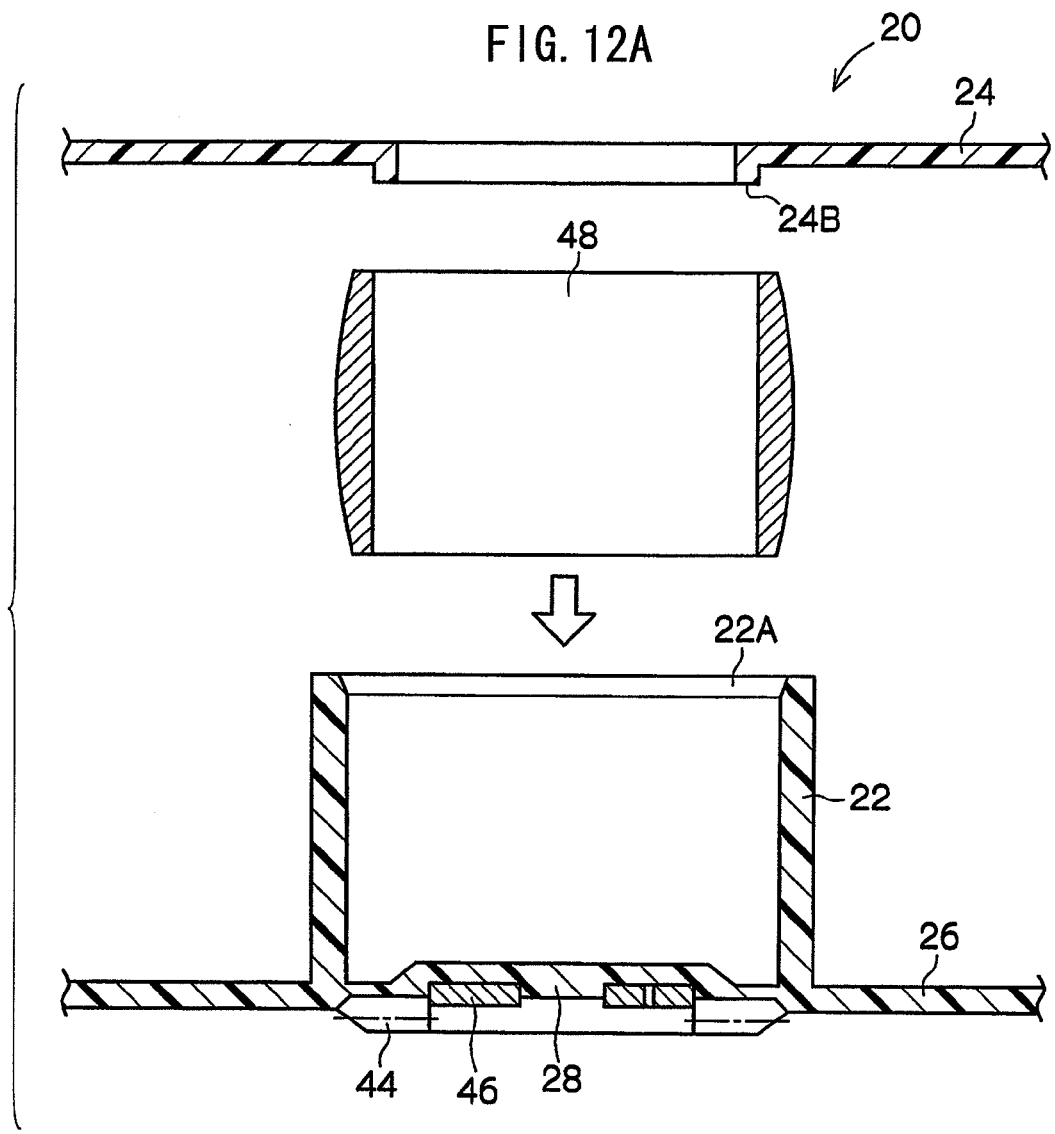
FIG. 12A is a schematic side view explaining a method of manufacturing another reel.
Figure 12B:
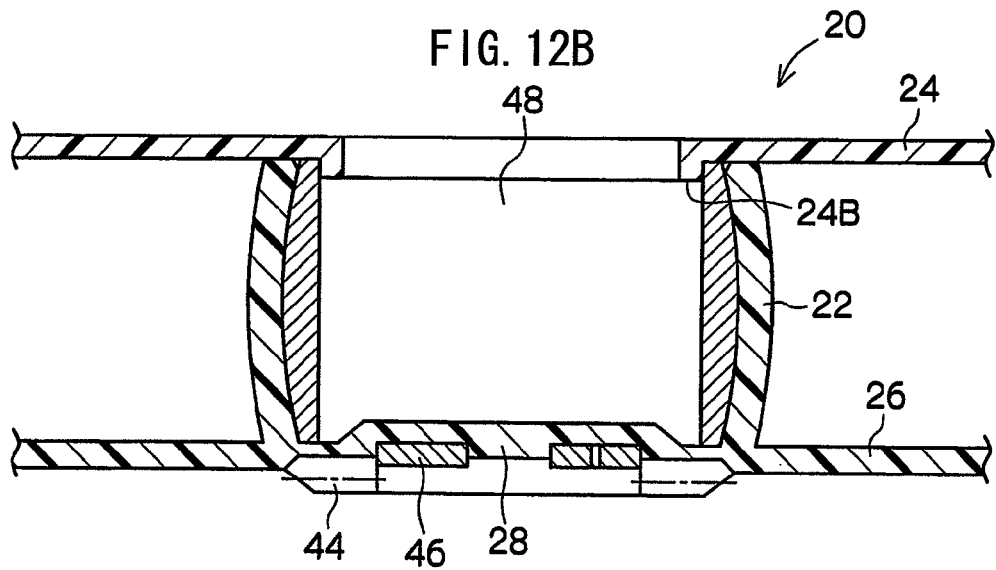
FIG. 12B is a schematic side view explaining a method of manufacturing another reel.

In a fourth modified example shown in FIG. 12A and FIG. 12B, the height (width K) of the ring-shaped member 48 is formed to be substantially the same as the height (width H) of the reel hub 22, and the outer peripheral surface of the ring-shaped member 48 is formed in a crowning shape. Accordingly, in this case, the standing ribs 23 are omitted. In accordance with such a structure, the overall rigidity of the reel hub 22 can be increased, and deformation of the upper and lower flanges 24, 26 can be suppressed.

Namely, local damage (deformation) of the recording tape T due to local differences in rigidity of the reel hub 22 during periods of long-term storage can be suppressed. Note that, in this case, it is preferable to make the plate thickness of the reel hub 22 slightly thinner than the plate thicknesses of the reel hubs 22 explained in FIG. 8A through FIG. 11B. Moreover, in this case, the reel hub 22 can be formed in a good substantially barrel shape even if not preformed as described above.

Figure 14:
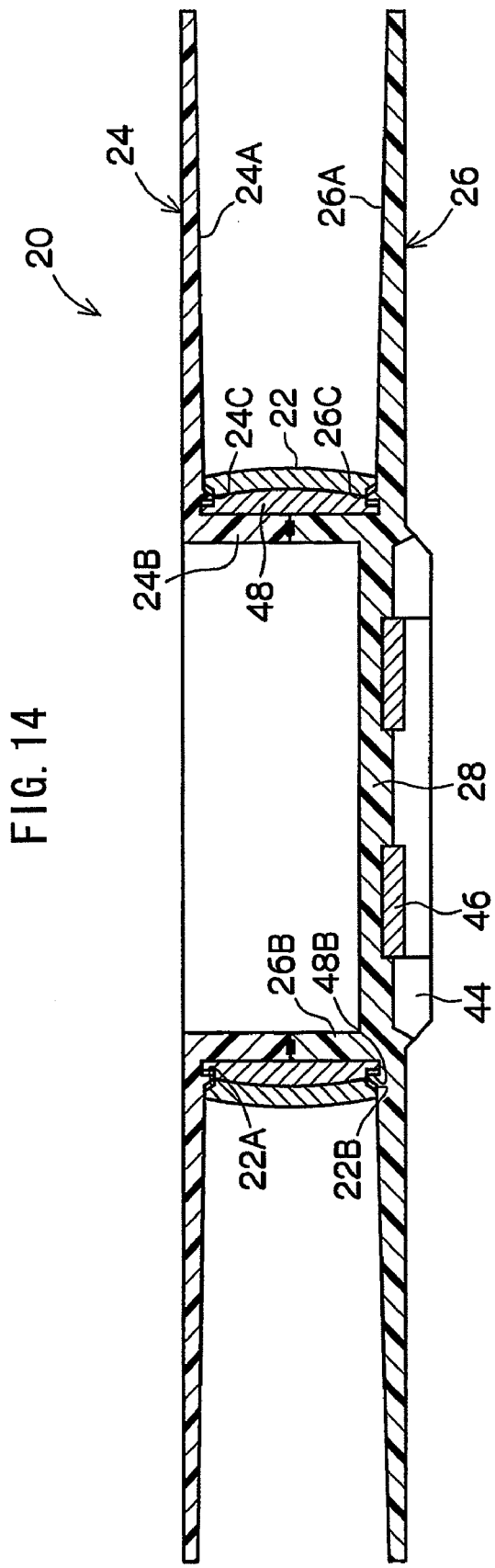
FIG. 14 is a schematic side view explaining a method of manufacturing another reel.

Although the reel hub 22 and the lower flange 26 are molded integrally in the above-described exemplary embodiment and above-described first through fourth modified examples, the same holds as well for structures in which the lower flange 26 and the reel hub 22 are formed as separate members. Namely, the same holds for structures in which, as shown in FIG. 13 and FIG. 14, the boss portion 24B of the upper flange 24 extends to substantially ½ of the height of the reel hub 22, a boss portion 26B of the lower flange 26 extends to substantially ½ of the height of the reel hub 22, the lower end surface of the boss portion 24B and the upper end surface of the boss portion 26B can be welded to each other (e.g., an energy director 27 is formed at the upper end surface of the boss portion 26B), the ring-shaped member 48 is fit at the radial direction outer sides of the boss portions 24B, 26B, and the cylindrical-shaped reel hub 22 is fit at the radial direction outer side of the ring-shaped member 48.

In this case, the substantially barrel-shaped reel hub 22 can be easily formed by making the configuration of the outer peripheral surface of the ring-shaped member 48 be a crowning shape. Further, in this case, because the upper flange 24 and the lower flange 26 and the reel hub 22 are independent of one another, there is the effect that deformation of the reel hub 22 due to tight-winding of the recording tape T does not affect the upper flange 24 and the lower flange 26 (the upper flange 24 and the lower flange 26 do not deform). Note that the ring-shaped member 48 does not have to be formed over the entire width direction length of the reel hub 22, and may be a short member in the same way as in FIG. 8A through FIG. 11B. Moreover, in this case, it is fine if the outer configuration of the ring-shaped member 48 is made to be straight rather than substantially barrel-shaped.

Further, plural engaging portions 24C, 26C are formed so as to project out from the upper flange 24 and the lower flange 26, respectively, at predetermined intervals. The radial direction inner sides of the engaging portions 24C, 26C engage with plural engaged portions 48B which are formed at predetermined intervals at the upper and lower end portions, respectively, of the outer peripheral surface of the ring-shaped member 48. The engaging portions 24C, 26C and the engaged portions 48B are engaged with a clearance of a range which can absorb changes in the shape and changes over time of the reel hub 22 in the radial direction. In this way, the ring-shaped member 48 is made unable to rotate with respect to the upper flange 24 and the lower flange 26, and the positioning of both the ring-shaped member 48 and the upper and lower flanges 24, 26 is carried out, and deformation of the reel hub 22 or the upper and lower flanges 24, 26 does not affect the other.

In this case, the reel hub 22 is flexed in a substantial barrel shape due to the crowning shape of the outer peripheral surface of the ring-shaped member 48, and the coefficients of friction of the both increase. Therefore, relative rotation between the both is not possible. In this way, the reel hub 22 is a structure which cannot rotate with respect to the upper flange 24 and the lower flange 26. Note that the chamfered portions 22A, 22B of the reel hub 22 substantially engage with the radial direction outer sides of the engaging portions 24C, 26C.

As other structures of the reel 20, the reel hub 22 may be molded integrally with the upper flange 24 rather than the lower flange 26, or, the reel hub 22, the upper flange 24, and the lower flange 26 may be molded integrally. In either of these cases, it suffices to merely press-fit the ring-shaped member 48, which has the predetermined width K and whose outer diameter is larger than the inner diameters of the end portion sides of the reel hub 22, at the inner side of the reel hub 22. Therefore, the reel 20, which is provided with this substantially barrel-shaped reel hub 22, can be manufactured easily and at a low cost.

Namely, mass production can be realized because both an improvement in quality (in particular, there is no damage to the recording tape T and the precision also is stable) and a reduction in cost can be achieved while succeeding injection molding which is an inexpensive, highly-accurate method of manufacturing a conventional reel. Further, because it ends up being possible to improve the rigidity of the reel hub 22, there are few changes in the dimensions of the recording tape T during storage and of the servo signals and data signals written on the recording tape T, and the recording tape T can be stored well. In particular, in a reel 20 in which at least either of the upper and lower flanges 24, 26 is molded integrally with the reel hub 22, the amount of deformation of the flanges 24, 26 over time or due to changes in temperature and humidity can be made to be small.

In the reel 20 of the present exemplary embodiment, the reel hub 22 is formed in a substantial barrel shape. However, the reel 20 relating to the present exemplary embodiment includes all reels which are formed such that the outer diameter of at least a portion of the reel hub 22 is larger than the outer diameters at the upper and lower both end portions thereof. Further, the present exemplary embodiment is an example which is applied to the recording tape cartridge 10 which is configured so as to accommodate the single reel 20 within the case 12. However, the present invention is not limited to this and may be applied to, for example, a two-reel recording tape cassette in which two reels are accommodated within a case.

The present invention provides a tape reel and a take-up reel at which it is possible to easily and inexpensively manufacture a hub having, at the outer peripheral surface thereof, a portion whose diameter is larger than diameters of each of the end portions thereof, and provides a recording tape cartridge having the tape reel, and a drive device having the take-up reel.

A first aspect of the present invention provides a tape reel comprising: a hub made of resin on which a recording tape is wound; and flanges provided at both end portions of the hub, wherein a ring-shaped member, whose outer diameter is larger than an inner diameter of at least one portion of the hub, is press-fit in at an inner side of the hub, and a second portion, whose diameter is larger than diameters of each of the end portions of the hub, is formed at least a portion of an outer peripheral surface of the hub.

A third aspect of the present invention provides a take-up reel provided within a drive device and on which is wound a recording tape pulled out from a recording tape cartridge, the take-up reel comprising: a hub made of resin on which the recording tape is wound; and flanges provided at both end portions of the hub, wherein a substantially-ring-shaped member, whose outer diameter is larger than an inner diameter of at least one portion of the hub, is press-fit in at an inner side of the hub, and a second portion, whose diameter is larger than diameters of each of the end portions of the hub, is formed at least a portion of an outer peripheral surface of the hub.

According to the first and third aspects of the present invention, a tape reel and a take-up reel which have a hub having, at an outer peripheral surface thereof, a portion whose diameter is larger than diameters of each of the end portions of the hub, can be manufactured easily and inexpensively. Namely, while succeeding injection molding which is an inexpensive, highly-accurate method of manufacturing conventional tape reels and take-up reels, both an improvement in quality (in particular, there is no damage to the recording tape T and the precision also is stable) and a reduction in cost can be achieved, and mass production can be realized. Further, because it ends up that the rigidity of the hub is improved, there are few changes in the dimensions of the recording tape during storage and of the servo signals and data signals written on the recording tape, and the recording tape can be stored well. In particular, at a tape reel and a take-up reel in which at least either of the upper and lower flanges is integral with the hub, the amount of deformation of the flanges at the time when the tape is wound, or due to changes in temperature and humidity, or over time, can be made to be small.

When the hub has, at the outer peripheral surface thereof, a portion whose diameter is larger than diameters at each of the end portions of the hub, the recording tape is wound so as to be set toward the maximum diameter portion. Therefore, in the state in which the recording tape is wound on the tape reel or the take-up reel, the amount by which the recording tape protrudes from the wound surface, or steps form in the wound surface, can be suppressed. Accordingly, the position of the recording tape which is drawn-out from the tape reel or which is taken-up onto the take-up reel can be stabilized, and when the recording tape is traveling at the drive device, positional fluctuations of the recording tape in the vertical direction (a direction orthogonal to the traveling direction of the recording tape, i.e., the width direction of the recording tape) can be suppressed. Further, because protruding and the like of a single layer of the recording tape is suppressed, the occurrence of tape edge damage of the recording tape can be reduced even at times of transporting and handling. Accordingly, even at high-density-recording drive devices, the occurrence of recording/playback errors of data signals (information) can be reduced.

In the first aspect of the present invention, an axial direction width of the ring-shaped member may be smaller than an axial direction width of the hub.

In the third aspect of the present invention, an axial direction width of the substantially-ring-shaped member may be smaller than an axial direction width of the hub.

According to the above-described aspects, the hub which has, at its outer peripheral surface, a portion whose diameter is larger than diameters of each of the end portions of the hub, can be formed well. Note that the width of the ring-shaped member or the substantially-ring-shaped member is approximately greater than or equal to ¼ and less than or equal to ⅚ of the width of the hub, and preferably greater than or equal to ¼ and less than or equal to ¾ of the width of the hub. If the width of the ring-shaped member or the substantially-ring-shaped member is less than ¼ of the width of the hub, the shape may become stepped, or may become substantially lozenge-shaped, or may become warped. Further, if the width of the ring-shaped member or the substantially-ring-shaped member is greater than ⅚ of the width of the hub, there are cases in which the necessary convex amount (the difference in the outer diameters of the hub) cannot be obtained.

In the first aspect of the present invention, a shape of the outer peripheral surface of the hub may be formed in advance such that, after press-fitting of the ring-shaped member, an outer diameter of one end portion side and an outer diameter of another end portion side are substantially the same or are predetermined dimensions.

In the third aspect of the present invention, a shape of the outer peripheral surface of the hub may be formed in advance such that, after press-fitting of the substantially-ring-shaped member, an outer diameter of one end portion side and an outer diameter of another end portion side are substantially the same or are predetermined dimensions.

According to the above-described aspects, the hub which has, at its outer peripheral surface, a portion whose diameter is larger than diameters of each of the end portions of the hub, can be formed well. Namely, at the time when the ring-shaped member or substantially-ring-shaped member is inserted into the hub, there are cases in which a difference with the intended, predetermined dimensions arise. However, if this difference is given to the configuration of the hub in advance before the ring-shaped member or substantially-ring-shaped member is inserted into the hub, it is possible to, after insertion of the ring-shaped member or the substantially-ring-shaped member into the hub, obtain an outer diameter of the hub which is nearer to the intended, predetermined dimensions and configuration.

In the first aspect of the present invention, a modulus of elasticity of the ring-shaped member may be greater than or equal to a modulus of elasticity of the hub.

In the third aspect of the present invention, a modulus of elasticity of the substantially-ring-shaped member may be greater than or equal to a modulus of elasticity of the hub.

According to the above-described aspects, the rigidity of the hub can be improved.

In the first aspect of the present invention, an outer peripheral surface of the ring-shaped member may be formed in an arc shape when seen from a side view.

In the third aspect of the present invention, an outer peripheral surface of the substantially-ring-shaped member may be formed in an arc shape when seen from a side view.

According to the above-described aspects, the ring-shaped member or substantially-ring-shaped member can be easily press-fit into the hub. Further, the hub which has, at its outer peripheral surface, a portion whose diameter is larger than diameters of each of the end portions of the hub, can be formed well.

In the first aspect of the present invention, a ratio of a difference between a larger radius of radii of both end portions of the hub, and a radius of a maximum diameter portion of the hub after press-fitting of the ring-shaped member, with respect to a width of the recording tape may be less than or equal to 0.0063.

In the third aspect of the present invention, a ratio of a difference between a larger radius of radii of both end portions of the hub, and a radius of a maximum diameter portion of the hub after press-fitting of the substantially-ring-shaped member, with respect to a width of the recording tape which is wound may be less than or equal to 0.0063.

According to the above-described aspects, winding the recording tape such that it is set toward the maximum diameter portion of the hub can be achieved well. Note that the width of the recording tape is a standard value and a median of a tolerance width relating to the tape width of the recording tape at the drive device in which this recording tape is used. Further, it is preferable that the ratio of the difference between the larger of the radii of the both end portions of the hub, and the radius of the maximum diameter portion of the hub after press-fitting of the ring-shaped member or the substantially-ring-shaped member, with respect to the width of the recording tape be less than or equal to 0.0050.

In the first aspect of the present invention, a width of the recording tape may be approximately 12.65 mm, and a difference between a larger radius of radii of both end portions of the hub, and a radius of a maximum diameter portion of the hub after press-fitting of the ring-shaped member, may be less than or equal to 0.08 mm.

In the third aspect of the present invention, a width of the recording tape which is wound may be approximately 12.65 mm, and a difference between a larger radius of radii of both end portions of the hub, and a radius of a maximum diameter portion of the hub after press-fitting of the substantially-ring-shaped member, may be less than or equal to 0.08 mm.

According to the above-described aspects, winding the recording tape such that it is set toward the maximum diameter portion of the hub can be achieved well. Note that the aforementioned difference is preferably less than or equal to 0.064 mm. If the difference is greater than 0.08 mm, damage would arise at the tape edges. Within a range of greater than 0.064 mm to less than or equal to 0.08 mm, there were no particular problems in the above-described examples, but there is the possibility of being easily affected by the thickness of the recording tape and the rigidity of the hub. It is preferable that the difference is less than or equal to 0.064 mm in order to reliably ensure the quality of the tape edges.

In the first aspect of the present invention, the tape reel may further comprise a standing rib provided at an inner peripheral surface of the hub which restricts a position of a brake member, the brake member restricting a rotation of the tape reel, and a portion of the standing rib which the ring-shaped member abuts may be flat.

According to the above-described aspect, by prescribing the height of the standing rib, the position where the ring-shaped member is disposed can be restricted to the substantially central portion in the width direction. Namely, because it suffices for the ring-shaped member to be press-fit in until it abuts the standing rib, the press-fitting process can be simplified.

In the first aspect of the present invention, the tape reel may further comprise a standing rib provided at an inner peripheral surface of the hub which restricts a position of a brake member, the brake member restricting a rotation of the tape reel, and the standing rib, and a boss portion, which is provided at an inner peripheral edge portion of one of the flanges so as to extend toward another flange and which engages with an inner peripheral surface side of one end portion of the reel hub from a radial direction inner side, may be configured so as to abut the ring-shaped member.

According to the above-described aspect, when an impact is applied to the recording tape cartridge (the tape reel) due to the recording tape cartridge being dropped or the like, separation and movement of the ring-shaped member can be deterred by one of the flanges.

A second aspect of the present invention provides a recording tape cartridge comprising: the tape reel of the first aspect; and a case accommodating the tape reel rotatably.

According to the above-described aspect, substantially the same effects as the effects of the first aspect can be obtained at the recording tape cartridge. In particular, in order to increase the recording capacity per recording tape cartridge, there has been the trend to make the recording tape thinner. Accordingly, the rigidity of the recording tape is reduced, and the strength of the tape edges also is reduced. However, because positional fluctuations of the recording tape in the vertical direction can be suppressed as described above, tape edge damage due to the recording tape hitting the flanges or the like, and the frequency of occurrence of protruding of a single layer which starts due to the recording tape hitting the flanges or the like, can be kept small.

In the above-described aspect, the tape reel may be a single tape reel.

According to the above-described aspect, at the reel, the regulated windability of the recording tape can be improved and positional fluctuations in the axial direction of the hub at the time when the recording tape travels can be suppressed. Therefore, the present invention is suited to single-reel recording tape cartridges for data back-up of computers for which a high recording capacity is desired.

In the above-described aspect, servo signals, which are a reference for tracking by a recording/playback head, may be recorded on the recording tape.

According to the above-described aspect, because the traveling position of the recording tape can be stabilized, the occurrence of errors in reading the servo signals and recording/playback errors of data signals can be reduced.

A fourth aspect of the present invention provides a drive device in which a recording tape cartridge is loaded, comprising: the take-up reel of the third aspect on which the recording tape, which is pulled out from the recording tape cartridge, is wound.

According to the above-described aspect, effects which are substantially the same as the effects of the third aspect can be obtained at a drive device.

Note that, when the maximum diameter portion of the hub is formed at the substantially central portion of the hub, the hub can be formed in a substantial barrel shape. Further, if the maximum diameter portion thereof is offset from the substantially central portion of the hub toward either one flange, the hub can be formed in a substantial pot shape. In a case in which the hub is formed in a substantial barrel shape, the recording tape can be wound on the substantially central portion of the hub. In a case in which the hub is formed in a substantial pot shape, the recording tape can, while being set toward either one of the flanges, be wound around a place which is offset from the center.

When the ring-shaped member or substantially-ring-shaped member is molded of a metal such as aluminum, stainless steel, plated steel, copper, brass, or the like, the rigidity of the hub can be improved and the ring-shaped member or substantially-ring-shaped member does not rust, which is preferable. Note that, if aluminum is used, it is preferably subjected to alumite treatment. Further, the ring-shaped member or substantially-ring-shaped member may be molded of the same resin material as the hub. In this case, the ring-shaped member or substantially-ring-shaped member can be easily press-fit into the hub.

As described above, the present invention can provide a tape reel and a take-up reel at which it is possible to easily and inexpensively manufacture a hub having, at an outer peripheral surface thereof, a portion whose diameter is larger than the diameters of the both end portions, and a recording tape cartridge having the tape reel and a drive device having the take-up reel.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A tape reel comprising:
    a hub made of resin on which a recording tape is wound, the hub having end portions and including a large-diameter portion whose diameter is larger than diameters of each of the end portions of the hub;
    a flange provided at both end portions of the hub; and
    a ring-shaped member whose outer diameter is larger than an inner diameter of at least one portion of the hub, said outer diameter being press-fit in at an inner peripheral surface side of the hub,
    wherein configuration of the large-diameter portion of the hub is caused by the ring-shaped member, and
    wherein said ring-shaped member has a continuous outer diameter along an axial direction of the member.

2. The tape reel of claim 1, wherein an axial direction width of the ring-shape member is smaller than an axial direction width of the hub.

3. The tape reel of claim 1, wherein a shape of the outer peripheral surface of the hub is formed in advance such that, after press-fitting of the ring-shaped member, an outer diameter of one end portion side and an outer diameter of another end portion side are substantially the same or are predetermined dimensions.

4. The tape reel of claim 1, wherein a modulus of elasticity of the ring-shaped member is greater than or equal to a modulus of elasticity of the hub.

5. The tape reel of claim 1, wherein an outer peripheral surface of the ring-shaped member is formed in an arc shape when seen from a side view.

6. The tape reel of claim 1, wherein a ratio of a difference between a larger radius of radii of both end portions of the hub, and a radius of a maximum diameter portion of the hub after press-fitting of the ring-shaped member, with respect to a width of the recording tape is less than or equal to 0.0063.

7. The tape reel of claim 1, wherein a width of the recording tape is approximately 12.65 mm, and a difference between a larger radius of radii of both end portions of the hub, and a radius of a maximum diameter portion of the hub after press-fitting of the ring-shaped member, is less than or equal to 0.08 mm.

8. The tape reel of claim 1, further comprising a standing rib provided at an inner peripheral surface of the hub which restricts a position of a brake member, the brake member restricting a rotation of the tape reel,
    wherein a portion of the standing rib which the ring-shaped member abuts is flat.

9. The tape reel of claim 1, further comprising a standing rib provided at an inner peripheral surface of the hub which restricts a position of a brake member, the brake member restricting a rotation of the tape reel,
    wherein the standing rib, and a boss portion, which is provided at an inner peripheral edge portion of one of the flanges so as to extend toward another flange and which engages with an inner peripheral surface side of one end portion of the reel hub from a radial direction inner side, are configured so as to abut the ring-shaped member.

10. A recording tape cartridge comprising:
    the tape reel of claim 1; and
    a case accommodating the tape reel rotatably.

11. The recording tape cartridge of claim 10, wherein the tape reel is a single tape reel.

12. The recording tape cartridge of claim 10, wherein servo signals, which are a reference for tracking by a recording/playback head, are recorded on the recording tape.

13. A take-up reel provided within a drive device and on which is wound a recording tape pulled out from a recording tape cartridge, the take-up reel comprising:
    a hub made of resin on which the recording tape is wound, the hub having end portions and including a large-diameter portion whose diameter is larger than diameters of each of the end portions of the hub;
    a flange provided at both end portions of the hub; and
    a substantially-ring-shaped member whose outer diameter is larger than an inner diameter of at least one portion of the hub, said outer diameter being press-fit in at an inner peripheral surface side of the hub,
    wherein configuration of the large-diameter portion of the hub is caused by the ring-shaped member, and
    wherein said ring-shaped member has a continuous outer diameter along an axial direction of the member.

14. The take-up reel of claim 13, wherein an axial direction width of the substantially-ring-shaped member is smaller than an axial direction width of the hub.

15. The take-up reel of claim 13, wherein a shape of the outer peripheral surface of the hub is formed in advance such that, after press-fitting of the substantially-ring-shaped member, an outer diameter of one end portion side and an outer diameter of another end portion side are substantially the same or are predetermined dimensions.

16. The take-up reel of claim 13, wherein a modulus of elasticity of the substantially-ring-shaped member is greater than or equal to a modulus of elasticity of the hub.

17. The take-up reel of claim 13, wherein an outer peripheral surface of the substantially-ring-shaped member is formed in an arc shape when seen from a side view.

18. The take-up reel of claim 13, wherein a ratio of a difference between a larger radius of radii of both end portions of the hub, and a radius of a maximum diameter portion of the hub after press-fitting of the substantially-ring-shaped member, with respect to a width of the recording tape which is wound is less than or equal to 0.0063.

19. The take-up reel of claim 13, wherein a width of the recording tape which is wound is approximately 12.65 mm, and a difference between a larger radius of radii of both end portions of the hub, and a radius of a maximum diameter portion of the hub after press-fitting of the substantially-ring-shaped member, is less than or equal to 0.08 mm.

20. A drive device in which a recording tape cartridge is loaded, comprising:
the take-up reel of claim 13 on which the recording tape, which is pulled out from the recording tape cartridge, is wound.

21. The tape reel according to claim 1, wherein the ring shaped member is disposed at a substantially central portion of the hub in an axial direction of the hub where the member is press fit.

22. The tape reel according to claim 1, wherein the ring shaped member has no flange portions at end surfaces of the ring member.

23. The tape reel according to claim 21, wherein the ring member is disposed entirely within the hub.

* * * * *